US011322073B2

United States Patent
Hou et al.

(10) Patent No.: US 11,322,073 B2
(45) Date of Patent: May 3, 2022

(54) METHOD AND APPARATUS FOR DYNAMICALLY OPTIMIZING GAMMA CORRECTION FOR A HIGH DYNAMIC RATIO IMAGE

(71) Applicant: Dell Products, LP, Round Rock, TX (US)

(72) Inventors: Ke Xin Hou, Shanghai (CN); Kong Le Wong, Shanghai (CN); Jun Sun, Shanghai (CN)

(73) Assignee: DELL PRODUCTS, LP, Round Rock, TX (US)

( * ) Notice: Subject to any disclaimer, the term of this patent is extended or adjusted under 35 U.S.C. 154(b) by 0 days.

(21) Appl. No.: 16/138,559

(22) Filed: Sep. 21, 2018

(65) Prior Publication Data
US 2020/0098304 A1    Mar. 26, 2020

(51) Int. Cl.
G09G 3/20 (2006.01)
G06K 9/46 (2006.01)
G06K 9/62 (2022.01)

(52) U.S. Cl.
CPC ......... *G09G 3/2074* (2013.01); *G06K 9/4638* (2013.01); *G06K 9/4652* (2013.01);
(Continued)

(58) Field of Classification Search
None
See application file for complete search history.

(56) References Cited

U.S. PATENT DOCUMENTS

| 2003/0085906 A1* | 5/2003 | Elliott | G09G 3/20 345/613 |
| 2003/0140019 A1* | 7/2003 | Gutta | G06K 9/6251 706/15 |

(Continued)

OTHER PUBLICATIONS

Y. Shi, J. Yang, and R. Wu, "Reducing Illumination Based on Nonlinear Gamma Correction," 2007 IEEE International Conference on Image Processing, Sep. 2007, pp. I-529 to I-532.

(Continued)

*Primary Examiner* — Yanna Wu
(74) *Attorney, Agent, or Firm* — Prol Intellectual Property Law, PLLC; H. Kenneth Prol

(57) ABSTRACT

An information handling system operating a learning dynamic gamma-correction optimization system may execute a method including identifying a combination of red, green, and blue subpixel component values for a plurality of pixels, and determining optimal red, green, and blue subpixel component values for the plurality of pixels by running a gamma correction algorithm using a gamma correction factor associated with a maximum gradient energy between the plurality of pixels. A training session for a neural network may include associating each of the red, green, and blue subpixel component values with one of a plurality of input signal node values and forward propagating the input signal node values through the neural network to output preliminary output signal node values using initial weighting values, comparing the optimal red, green, and blue subpixel component values with the preliminary output signal node values to determine error signals for each output value, determining an error signal associated with each node of the neural network by back propagating the determined error signals through the neural network, and determining a plurality of corrected weighting variables that would result
(Continued)

in output of the optimal red, green, and blue subpixel component values.

20 Claims, 11 Drawing Sheets

(52) U.S. Cl.
CPC ......... *G06K 9/6257* (2013.01); *G09G 3/2003* (2013.01); *G09G 2320/0276* (2013.01)

(56) References Cited

U.S. PATENT DOCUMENTS

| | | | |
|---|---|---|---|
| 2011/0298763 A1* | 12/2011 | Mahajan | G09G 3/025 345/207 |
| 2019/0189049 A1* | 6/2019 | An | G09G 3/2003 |
| 2019/0213719 A1* | 7/2019 | Hiasa | H04N 1/6027 |
| 2019/0279045 A1* | 9/2019 | Li | G06K 9/62 |
| 2019/0335347 A1* | 10/2019 | Vlachou | H04W 24/02 |

OTHER PUBLICATIONS

C. Yang, Z. Wang, Z. Cai, J. Zhang, "Research on the Image Definition Criterion on the High Accuracy Image Measurement System," 2010 3rd International Congress on Image and Signal Processing, Oct. 2010, pp. 1671 to 1675.

* cited by examiner

METHOD AND APPARATUS FOR DYNAMICALLY OPTIMIZING GAMMA CORRECTION FOR A HIGH DYNAMIC RATIO IMAGE

FIELD OF THE DISCLOSURE

The present disclosure generally relates to gamma-correction of high dynamic ratio (HDR) images for information handling systems. The present disclosure more specifically relates to dynamically optimizing gamma correction for HDR images displayed on a video display of the information handling system via a learning, neural network.

BACKGROUND

As the value and use of information continues to increase, individuals and businesses seek additional ways to process and store information. One option available to clients is information handling systems. An information handling system generally processes, compiles, stores, and/or communicates information or data for business, personal, or other purposes thereby allowing clients to take advantage of the value of the information. Because technology and information handling needs and requirements vary between different clients or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific client or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems. The information handling system may include telecommunication, network communication, and video communication capabilities. Further, the information handling system may include a video display for displaying high dynamic ratio (HDR) images.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings may indicate similar or identical items.

DETAILED DESCRIPTION OF THE DRAWINGS

Figure 1:
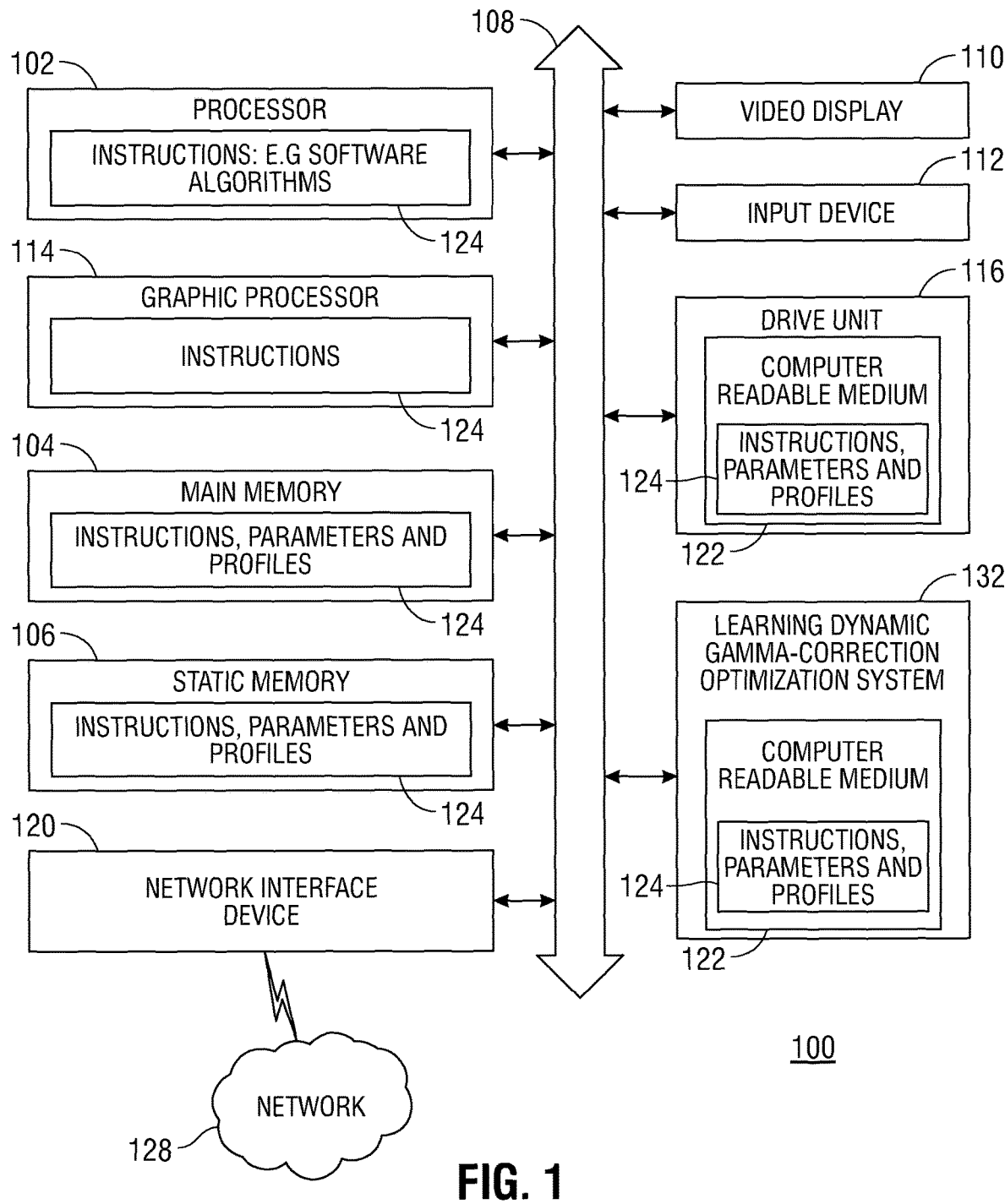
FIG. 1 is a block diagram illustrating an information handling system according to an embodiment of the present disclosure.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

An increasing number of display devices are being designed to support high dynamic range (HDR) video inputs capable of much greater resolution than previous video display standards. Many methods exist to increase the quality of HDR display images, including gamma-correcting the brightness or intensity at which each pixel emits light. Each pixel in a video display may include at least three sub-pixels, including a red (R), green (G), and blue (B). A process or graphics processor of an information handling system may receive HDR digital image data associating each sub-pixel of the high definition video display with an intensity value. A processor in embodiments may determine a voltage to apply to each of the pixels or sub-pixels in a video display based on such HDR image data, in order to produce an HDR digital image described by the light component or overall intensities assigned to each pixel in the HDR image data. The processor may then apply those specific voltages to their associated sub-pixels in a high definition video display in order to display the HDR image.

The intensities assigned to each sub-pixel in embodiments may have been determined by the creator of the HDR image data specifically to optimize the quality of the HDR image displayed. Variation between an intensity of light emitted at a first pixel and an intensity of light emitted at a second pixel may lead to a contrast of light and color between the pixels. Greater contrast within an image may increase the quality of the image. Thus, it is important to conserve the contrast, or difference between intensities of light emitted at each pixel or sub-pixel when determining the voltage to apply to each sub-pixel based on the intensities given in the HDR image data.

However, when assigning a voltage based on an intensity value, the non-linear relationship between voltage and intensity must be taken into account. The intensity emitted by a sub-pixel is a power function of the voltage applied to the sub-pixel, where the power to which the voltage is raised is called the "gamma" for that display. The gamma depends on the mechanical and structural details of the video display. Further, each display may be associated with a different gamma. For example, if a video display has a gamma of 2.5, the intensity actually emitted by a sub-pixel will be equivalent to the voltage applied at that sub-pixel, raised to the power of 2.5.

In order to account for this discrepancy, many information handling systems apply a gamma correction to the HDR image data prior to applying voltages to each of the sub-pixels. Such a gamma correction method may involve fitting the voltage values for each of the sub-pixel in the original HDR image to a curve that is the direct inverse of the intensity/voltage power function of the video display. In other words, the processor may generate gamma-corrected HDR image data for each sub-pixel by raising the voltage associated with that sub-pixel in the original HDR image data by the inverse of the gamma for the video display. The value of the inverse of the gamma for the display in such embodiments may be referred to as a gamma-correction factor. In such a way, the processor may make the relationship between the gamma-corrected voltage applied to each sub-pixel and the intensity at which each sub-pixel is intended to emit light linear, thus conserving the contrast of the original image.

Existing gamma-correction methods involve applying a single gamma-correction factor to all pixels of the video display. Current systems include manual or trial-and-error determination of contrast levels and gamma correction for varied types of desired color schemes for the appearance of images displayed pursuant to the HDR image data. Further, it is assumed the gamma-correction factor in these methods is determined upon manufacture of the video display, and does not change. A system is needed to determine a gamma-correction factor for each pixel or sub-pixel of a video display based on the HDR digital image being displayed. Further, a system is needed wherein such a gamma-correction factor may be dynamically altered as new HDR digital images are displayed over time. Embodiments of the present disclosure address these issues by dynamically identifying an optimal gamma-correction factor for each sub-pixel in a video display through use of a learning dynamic gamma-correction optimization system.

The determination and application of optimal gamma-correction values to intensity values of a plurality of pixels of a video display in embodiments of the present disclosure may be broken down into a learning phase and a working phase. During a learning phase, a learning dynamic gamma-correction optimization system in an embodiment may model a neural network for determining optimally gamma-corrected intensity values for one or more pixels in a predefined pixel window, and may determine optimal weight matrices for that neural network, based on the array of intensity values input into the network.

The optimal gamma-correction factor determined through the use of such a neural network in embodiments of the present disclosure may vary based on which of a plurality of color schemes are employed. A user in an embodiment may select from a plurality of available color schemes, including, for example, a high-contrast color scheme, a high-saturation color scheme, or a high-brightness color scheme. A high-contrast color scheme in an embodiment may be a color scheme associated with a gamma-correction factor known to maximize the gradient energy across a given pixel window having dimensions m×n, where m is the number of pixels across the width of the pixel window and n is the number of pixels across the height of the pixel window. Application in embodiments of the present disclosure of the gamma-correction value known to maximize gradient energy in such a way to each sub-pixel of the central pixel of the pixel window may result in sub-pixel intensity values (R', G', and B') optimally gamma-corrected according to the high-contrast color scheme.

During the learning phase, the learning dynamic gamma-correction optimization system may model the determination of an optimally gamma-corrected intensity value for a central pixel of a pixel window using a neural network. Such a neural network may be capable, during the working phase, of determining the optimally gamma-corrected intensity value to assign to a central pixel of a pixel window for any combination of intensity values assigned to the pixels within the pixel window. The neural network may be trained via determination of weighting values through the layers of the neural network to provide for the optimal gamma correction for central pixels within a pixel window such as for neighbor-eight determination of intensity value adjustments to optimize contrast or other appearance details of the displayed image at that pixel.

For example, a neural network in an embodiment may be capable of determining, during the working phase, the optimally gamma-corrected intensity value to assign to a central pixel of a 3×3 pixel window for any combination of intensity values assigned to the nine pixels within the 3×3 pixel window. For example, a 3×3 pixel window may be a neighbor-eight assessment of a central pixel in some embodiments. In order to design such a neural network, the learning dynamic gamma-correction optimization system may model the neural network as having an input layer, a plurality of hidden layers equivalent to the width of the pixel window, and an output layer in some embodiments of the present disclosure. Each of these layers in such an embodiment may include a number of nodes equivalent to the number of sub-pixels within the 3×3 pixel window (e.g. 27), and each of the layers of the network may be fully connected such that the outputs or activations of each node in a given layer impacts the outputs or activations of each node in a later, directly adjacent layer.

For each possible combination of intensities assigned to the pixels within the pixel window, the learning dynamic gamma-correction optimization system in an embodiment may forward propagate through such a neural network to determine a plurality of initially gamma-corrected intensity values for each of the sub-pixels within the pixel window. For example, for each possible combination, the learning dynamic gamma-correction optimization system in embodiments may associate each node of the input layer with one of the intensity values in the possible combination of intensity values, and may forward propagate these values through the hidden layers and output layer of the neural network to output initially gamma-corrected intensity values.

These output values in successive layers, including the output layer, in embodiments of the present disclosure may be a function of a plurality of weighting values from the previous layer and so forth until the input or first layer. Such weighting values in embodiments of the present disclosure may describe the degree to which the activation of a node in an earlier layer affects the output or activation of a connected node in a later, directly adjacent layer. The learning dynamic gamma-correction optimization system in embodiments may perform an initial forward propagation to determine initially gamma-corrected intensity values by assigning all weighting values a value of one or some other default weighting value. By changing only these weighting values, the learning dynamic gamma-correction optimization system in embodiments may train the neural network to output optimally gamma-corrected intensity values for the given combination of intensities to conform to an output of a calculated, desired gamma corrected intensity values in accordance with a desired color scheme.

In order to train the neural network in such a way, the learning dynamic gamma-correction optimization system in embodiments may first determine the degree to which the initially gamma-corrected intensity values output by the neural network during an initial forward propagation method differ from known optimally gamma-corrected intensity values. For example, the gamma-correction factor associated with the maximum gradient energy for each of the pixels within a pixel window may be applied to each of the intensities of those pixels in order to identify a known optimally gamma-corrected intensity value for each sub-pixel of the pixel window. The learning dynamic gamma-correction optimization system in embodiments may then determine an error signal associated with initially gamma-corrected intensity values output by the neural network following the initial forward propagation method by taking the absolute value of the difference between each of those initially gamma-corrected intensity values and their corresponding optimally gamma-corrected intensity values.

The learning dynamic gamma-correction optimization system in embodiments may then back-propagate these known error values through the layers of the neural network to identify an error signal associated with each node of each non-input layer. In embodiments of the present disclosure, the error signal generated at each node of the neural network may be a function of the error signals generated at each of the nodes providing input to that node, and the weighting values between that node and each of the nodes providing input to that node. Because each of those weighting values may be preset to a value of one in embodiments of the present disclosure, they are known. Further, each of the error signals for each of the nodes in the output layer may also be known using the approach described directly above. Using these known values, the error signals for each node in the layer immediately preceding the output layer may be determined. Such a method may be used one layer at a time, moving backwards toward the input layer, to determine each of the error signals associated with each of the nodes of all non-input layers of the neural network.

The learning dynamic gamma-correction optimization system in embodiments of the present disclosure may then determine optimal weighting values to apply to the relationships between each of the nodes of the neural network in order to generate optimally gamma-corrected intensity values at the output layer. Optimal weighting values may be determined using a gradient-descent method to minimize the cost function associated with each weighting value. Once optimal weighting values are determined in embodiments of the present disclosure, each weighting value may be stored in a neural network (.nn) file associating each weighting value with one relationship between two nodes of the neural network, and associating all of these weighting values with the given possible combination of intensities initially input into the neural network during the learning phase, as well as the color scheme associated with the learning phase.

During a working phase, the learning dynamic gamma-correction optimization system may generate a neural network having the same architecture as that used during the learning phase in order to optimally gamma-correct intensity values associated with pixels of a video display within a received HDR image according to a user-selected color scheme. For example, a user may select a specific color scheme (e.g. high-contrast), and the learning dynamic gamma-correction optimization system may receive a .nn file associated with that specific color scheme. The learning dynamic gamma-correction optimization system in an embodiment may further associate a set of sub-pixels of a physical video display with an m×n pixel window (e.g. 3×3), and may retrieve the intensity values associated with each of the sub-pixels within such pixel window within the received HDR image data. Each of these intensity values associated with these 27 sub-pixels in embodiments of the present disclosure may serve as one of the inputs into the input layer of the neural network.

The learning dynamic gamma-correction optimization system in embodiments may then reference the .nn file generated during the training phase in order to identify the optimal weighting values that are associated with the combination of intensity values assigned to the input nodes of the neural network immediately above. After applying these optimal weighting values to the nodes of the neural network in embodiments, the learning dynamic gamma-correction optimization system may forward propagate the input intensity values for each of the sub-pixels of the pixel window through the neural network, using optimal weighting values, to output optimally gamma-corrected intensity values for each of the sub-pixels within the pixel window. The learning dynamic gamma-correction optimization system in embodiments may then associate the optimally gamma-corrected intensity value associated with the sub-pixels of the central pixel of the pixel window with the pixel within the physical video display located at the central pixel position in a file reflecting corrected or optimized HDR image data. This method may be repeated for a plurality of pixel windows until each pixel in the video display has been included in at least one pixel window in order to generate a file reflecting corrected or optimized HDR image data for every pixel of the video display. The video display in embodiments may then instruct each of the sub-pixels to emit light according to the intensity value with which it is associated in the file reflecting corrected or optimized HDR image data in order to display an optimally gamma-corrected HDR image.

FIG. 1 illustrates an information handling system 100 similar to information handling systems according to several aspects of the present disclosure. In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, mobile device (e.g., personal digital assistant (PDA) or smart phone), server (e.g., blade server or rack server), a consumer electronic device, a network server or storage device, a network router, switch, or bridge, wireless router, or other network communication device, a network connected device (cellular telephone, tablet device, etc.), IoT computing device, wearable computing device, a set-top box (STB), a mobile information handling system, a palmtop computer, a laptop computer, a desktop computer, a communications device, an access point (AP), a base station transceiver, a wireless telephone, a land-line telephone, a control system, a camera, a scanner, a facsimile machine, a printer, a pager, a personal trusted device, a web appliance, or any other suitable machine capable of executing a set of instructions (sequential or otherwise) that specify actions to be taken by that machine, and can vary in size, shape, performance, price, and functionality.

In a networked deployment, the information handling system 100 may operate in the capacity of a server or as a client computer in a server-client network environment, or as a peer computer system in a peer-to-peer (or distributed) network environment. In a particular embodiment, the computer system 100 can be implemented using electronic devices that provide voice, video or data communication. For example, an information handling system 100 may be any mobile or other computing device capable of executing a set of instructions (sequential or otherwise) that specify actions to be taken by that machine. Further, while a single information handling system 100 is illustrated, the term "system" shall also be taken to include any collection of systems or sub-systems that individually or jointly execute a set, or multiple sets, of instructions to perform one or more computer functions.

The information handling system can include memory 104 (volatile (e.g. random-access memory, etc.), nonvolatile 106 (read-only memory, flash memory etc.) or any combination thereof), one or more processing resources, such as a central processing unit (CPU) 102, a graphics processing unit (GPU) 114, hardware or software control logic, or any combination thereof. Memory 104 and 106 may store instructions, parameters, profiles 124 as well as data such as .nn files and instructions for execution of various algorithms in software or firmware such as, for example, the learning dynamic gamma-correction optimization system 132 in example embodiments. Similarly, processing resources, such as a central processing unit (CPU) 102, a graphics processing unit (GPU) 114, hardware or software control logic, or any combination thereof may execute instructions and utilize parameters and profiles as well as data according to various embodiments. Additional components of the information handling system can include one or more storage devices, one or more communications ports for communicating with external devices, as well as, various input and output (I/O) devices, such as a keyboard, a mouse, a video/graphic display, or any combination thereof. The information handling system can also include one or more buses 108 operable to transmit communications between the various hardware components. Portions of an information handling system may themselves be considered information handling systems.

Information handling system 100 can include devices or modules that embody one or more of the devices or execute instructions for the one or more systems and modules described above, and operates to perform one or more of the methods described above. The information handling system 100 may execute code instructions 124 that may operate on servers or systems, remote data centers, or on-box in individual client information handling systems according to various embodiments herein. In some embodiments, it is understood any or all portions of code instructions 124 may operate on a plurality of information handling systems 100. For example, portions of a learning dynamic gamma-correction optimization system 132 may operate in an embodiment on a laptop, tablet, or stationary display device having a video display 110, while other portions may operate on a server located remotely from such a laptop, tablet, or station display device. In other embodiments, the learning dynamic gamma-correction optimization system 132 may operate entirely within the laptop, tablet, or stationary display device. In some embodiments the video display device 110, such as a stationary video display, may have a processor, memory, embedded controller and other circuitry capable of executing the working phase of the learning dynamic gamma-correction optimization system 132 in some embodiments. For example, the video display device 110 may receive a .nn file for implementing a trained neural network to optimally gamma-correct intensity values associated with pixels of a video display within a received HDR image according to a user-selected color scheme. In other embodiments, any processor or controller in an information handling system may execute the working phase of the learning dynamic gamma-correction optimization system 132 utilizing received .nn files with adjusted weight matrices for optimal gamma correction. In yet other embodiments, processing within an information handling system 100, such as a central processor, graphics processor such as processor 102 may execute a training phase of the learning dynamic gamma-correction optimization system 132 to determine adjusted weight matrices provided in .nn files for various color schemes for particular display types. Such training phase activity may occur at a training phase for manufacture of display devices 110 or may be conducted for distribution via information technology assistance services to provide desired color schemes for users.

The information handling system 100 may include a processor such as a central processing unit 102, a graphics processing unit 104, control logic or some combination of the same. Any of the processing resources may operate to execute code that is either firmware or software code. Moreover, the information handling system 100 can include memory such as main memory 104, static memory 106, computer readable medium 122 storing instructions 124 of the learning dynamic gamma-correction optimization system 132, and drive unit 116 (volatile (e.g. random-access memory, etc.), nonvolatile (read-only memory, flash memory etc.) or any combination thereof). The information handling system 100 can also include one or more buses 108 operable to transmit communications between the various hardware components such as any combination of various input and output (I/O) devices.

As shown, the information handling system 100 may further include a video display device 110. The video display device 110 in an embodiment may function as a liquid crystal display (LCD), an organic light emitting diode (OLED), a flat panel display, or a solid state display. Additionally, the information handling system 100 may include an input device 112, such as a keyboard, and/or a cursor control device, such as a mouse, touchpad, or gesture or touch screen input. The information handling system 100 can also include a disk drive unit 116.

The information handling system 100 may also include a learning dynamic gamma-correction optimization system 132 that may be operably connected to the bus 108. The learning dynamic gamma-correction optimization system 132 computer readable medium 122 may also contain space for data storage. The learning dynamic gamma-correction optimization system 132 may perform tasks related to applying an optimized gamma-corrected voltage to each sub-pixel of the video display 110 to display an optimized HDR digital image.

In an embodiment, the learning dynamic gamma-correction optimization system 132 may communicate with the main memory 104, the processor 102, the host video display 110, the alpha-numeric input device 112, host video display 110, and the network interface device 120 via bus 108, and several forms of communication may be used, including ACPI, SMBus, a 24 MHZ BFSK-coded transmission channel, or shared memory.

The network interface device shown as wireless adapter 120 can provide connectivity to a network 128, e.g., a wide area network (WAN), a local area network (LAN), wireless local area network (WLAN), a wireless personal area network (WPAN), a wireless wide area network (WWAN), or other network. Connectivity may be via wired or wireless connection. The wireless adapter 120 may operate in accordance with any wireless data communication standards. To communicate with a wireless local area network, standards including IEEE 802.11 WLAN standards, IEEE 802.15 WPAN standards, WWAN such as 3GPP or 3GPP2, or similar wireless standards may be used. Further, inter-device connectivity may be available via WPAN standards or via Bluetooth or similar standards. For example, the head mounted display headset may be wired in some circumstances or may be connected via wireless connectivity in other embodiments to a base information handling system.

In some embodiments, software, firmware, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations. It is understood that other devices such as peripheral devices may be connected via wireless or wired connectivity as well according to various protocols described herein.

The information handling system 100 can include a set of instructions 124 that can be executed to cause the computer system to perform any one or more of the methods or computer based functions disclosed herein. For example, instructions 124 may execute a learning dynamic gamma-correction optimization system 132, software agents, or other aspects or components. Various software modules comprising application instructions 124 may be coordinated by an operating system (OS), and/or via an application programming interface (API). An example operating system may include Windows®, Android®, and other OS types known in the art. Example APIs may include Win 32, Win32s, Win64, WinCE, Core Java API, or Android APIs.

The disk drive unit 116 and the learning dynamic gamma-correction optimization system 132 may include a computer-readable medium 122 in which one or more sets of instructions 124 such as software can be embedded. Similarly, main memory 104 and static memory 106 may also contain a computer-readable medium for storage of one or more sets of instructions, parameters, or profiles 124. The disk drive unit 116 and static memory 106 also contain space for data storage. Further, the instructions 124 may embody one or more of the methods or logic as described herein. For example, instructions relating to the learning dynamic gamma-correction optimization system 132 software algorithms may be stored here. In a particular embodiment, the instructions 124, parameters, and profiles 124 may reside completely, or at least partially, within the main memory 104, the static memory 106, and/or within the disk drive 116 during execution by the processor 102 of information handling system 100. As explained, some or all of the learning dynamic gamma-correction optimization system 132 may be executed locally or remotely. The main memory 104 and the processor 102 also may include computer-readable media.

Main memory 104 may contain computer-readable medium (not shown), such as RAM in an example embodiment. An example of main memory 104 includes random access memory (RAM) such as static RAM (SRAM), dynamic RAM (DRAM), non-volatile RAM (NV-RAM), or the like, read only memory (ROM), another type of memory, or a combination thereof. Static memory 106 may contain computer-readable medium (not shown), such as NOR or NAND flash memory in some example embodiments. The learning dynamic gamma-correction optimization system 132 and the drive unit 116 may include a computer-readable medium 122 such as a magnetic disk, or a static memory in an example embodiment. While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In other embodiments, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

When referred to as a "system", a "device," a "module," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCM-CIA) card, or other such expansion card), or a system (such as a motherboard, a system-on-a-chip (SoC), or a stand-alone device). The system, device, controller, or module can include software, including firmware embedded at a device, such as an Intel® Core class processor, ARM® brand processors, or other processors and chipsets, or other such device, or software capable of operating a relevant environment of the information handling system. The system, device, controller, or module can also include a combination of the foregoing examples of hardware or software. Note that an information handling system can include an integrated circuit or a board-level product having portions thereof that can also be any combination of hardware and software. Devices, modules, resources, controllers, or programs that are in communication with one another need not be in continuous communication with each other, unless expressly specified otherwise. In addition, devices, modules, resources, controllers, or programs that are in communication with one another can communicate directly or indirectly through one or more intermediaries.

Figure 2:
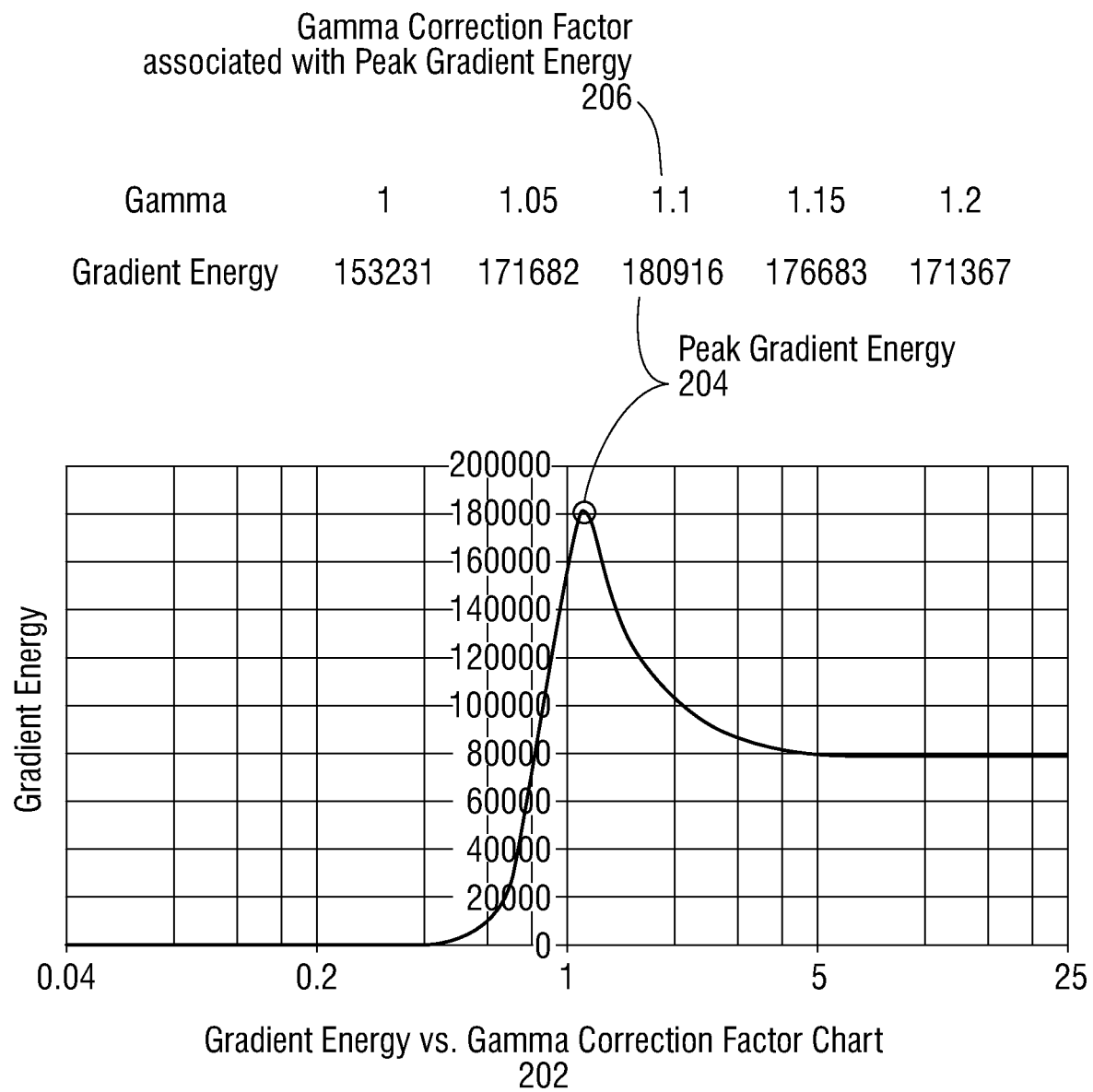
FIG. 2 is a graph diagram illustrating a chart of a gradient energy versus gamma correction factor according to an embodiment of the present disclosure.

FIG. 2 is a graph diagram illustrating a chart of a gradient energy versus gamma correction factor for a 3×3 pixel window of a video display displaying an HDR digital image according to an embodiment of the present disclosure. HDR digital image data received by a processor for display of an HDR digital image by an operably connected video display may include an illumination value associated with each sub-pixel (red, green, and blue sub-pixels within each pixel) of the video display. In order to display the HDR image described by the HDR image data, the processor or graphics processor of an information handling system may associate an intensity found in the HDR image data with a voltage to apply to a pixel or sub-pixel of the video display in order to cause that pixel or sub-pixel to emit light at the intensity found in the HDR image data. Voltage values used in such a process may range from zero to one in an embodiment. If a linear relationship between voltage applied to a pixel or sub-pixel and the resulting intensity of light emitted by that pixel or sub-pixel is assumed, the processor may determine the voltage to apply to a pixel by dividing the intensity associated with that pixel or sub-pixel in the HDR image data by the maximum possible intensity to identify a percentage value (e.g. a value between zero and one). For example, for a 24-bit RGB display, the R, G, and B values assigned to each sub-pixel in the HDR image data may range from zero to 255. As another example, for a 30 bit RGB display, the R, G, and B values assigned to each sub-pixel in the HDR image data may range from zero to 1,023. As yet another example, for a 32 bit RGB display (e.g. 4K resolution or higher), the R, G, and B values assigned to each sub-pixel in the HDR image data may range from zero to 4,095. Dividing the R, G, or B value given in the HDR image data by the maximum possible value, the processor may determine the value as a percentage (e.g. ranging from zero to one), and may apply a voltage equivalent to that number to the red, green, or blue sub-pixel with which the R, G, or B value is associated in the HDR image data, assuming a linear relationship between voltage and intensity.

However, assuming a linear relationship between the intensity of a pixel or sub-pixel and the voltage applied to that pixel or sub-pixel may result in distortion of the image as it is displayed. This is because the relationship between the voltage applied to a pixel or sub-pixel and the intensity actually emitted by the pixel or sub-pixel is non-linear. Rather, the relationship between intensity (I) and voltage (V) may be expressed as a function of an exponent, gamma (γ):

$$I \propto V^{\gamma} \quad (1)$$

In other words, if a linear relationship between the voltage and intensity were assumed, the actual intensity emitted by a pixel or sub-pixel would be exponentially higher than the desired intensity associated with that pixel or sub-pixel in the HDR image data. Existing systems often perform a gamma-correction method when assigning a voltage to each sub-pixel based on the illumination given in the HDR digital image data in order to account for this potential distortion. The gamma correction formula used in these existing systems may operate to raise the desired intensity associated with a pixel or sub-pixel in the HDR image data to an exponent roughly equivalent to the inverse of the gamma (γ) value from the equation (1) above using the following equation, where I' is a gamma-corrected intensity, I is the desired intensity associated with a pixel in the HDR image data, e is the natural base number, and r is a gamma-correction factor roughly equivalent to the inverse of the gamma (γ) value in equation (1):

$$I' = (I+e)^r \quad (2)$$

In an embodiment, this formula may be applied to an intensity associated with each sub-pixel (e.g. red, green, and blue sub-pixels of a single pixel), or may be applied to a gray scale intensity for a pixel, as determined based on the intensities applied to each of the red, green, and blue sub-pixels of that pixel. For example, the intensity associated with a red sub-pixel (R) may be gamma-corrected using the formula:

$$R' = (R+e)^r \quad (3)$$

Existing gamma-correction methods involve applying a single, static gamma correction factor (r), determined at the time of manufacture of the video display, to all pixels of the video display. These existing methods limit the ability to optimize the display of HDR digital images, because they do not allow for different pixels of the video display, or even different regions of the video display to be associated with different gamma-correction factors. These methods further do not allow for the gamma-correction factor used in determining a voltage that optimizes the contrast of the HDR digital image to change over time, or based on the HDR digital image being displayed. The learning dynamic gamma-correction optimization system in an embodiment may address these issues by dynamically identifying an optimal gamma-correction factor for each pixel in a video display.

The learning dynamic gamma-correction optimization system in an embodiment may identify a gamma-correction factor for each pixel in a video display so as to maximize the gradient energy between pixels nearby one another. For example, the learning dynamic gamma-correction optimization system in some embodiments described herein may analyze the gradient energy between pixels located within a neighbor-eight pixel window representing a pixel grid of size m×n. The magnitude of the gradient energy between any two pixels of the neighbor-eight pixel window may be found according to the following equation, where R ($P_i$), G ($P_i$), and B ($P_i$) are red, green, and blue intensity values associated with the red, green, and blue sub-pixels of a pixel identified within the neighbor-eight pixel window as pixel $P_i$ and where i has a value between zero and eight, and R ($P_0$), G ($P_0$), and B ($P_0$) are red, green, and blue intensity values associated with the red, green, and blue sub-pixels of a centrally located pixel within the neighbor-eight pixel window, as described in greater detail with reference to FIG. 3. as described in greater detail with reference to FIG. 3.

$$G(P_i) = \sqrt{\{[R(P_0) - R(P_i)]^2 + [G(P_0) - G(P_i)]^2 + [B(P_0) - B(P_i)]^2\}} \quad (4)$$

The total gradient energy across a neighbor-eight pixel window would then be found according to the equation:

$$G(I) = \Sigma_{i=1}^{(m \times n)-1} G(P_i) \quad (5)$$

Performing this determination for each of the pixels in the m×n grid gauges a total difference in original intensities drawn from the HDR image data between each of the pixels within the m×n grid. However, as described herein, most information handling systems apply a gamma-correction equation (2) to the received HDR digital image, such that the red, green, and blue sub-pixels within the pixel window are not necessarily displaying the original intensity associated with them in the HDR image data. Such existing systems may use equation (2) above to determine gamma-corrected intensities (R', G', and B') as functions of original intensities (R, G, and B), the natural base number (e), and a gamma-correction factor (r). The values for R, G, B, and e in an embodiment may be static, while the value of the gamma-correction factor r can be dynamically altered in order to maximize quality of the displayed HDR image. As described directly above, maximizing the gradient energy between nearby pixels may maximize the quality of the displayed HDR image. Thus, the learning dynamic gamma-correction optimization system in an embodiment may determine the gradient energy across all pixels in an m×n grid for several values of the gamma-correction factor (r) in order to find an optimal gamma-correction factor associated with the highest resulting gradient energy.

For example, the learning dynamic gamma-correction optimization system in an embodiment may identify a gradient energy G(I) for each value of the gamma-correction factor r and plot these values in the gradient energy vs. gamma correction factor chart 202. As shown in FIG. 2, a peak gradient energy 204 can be seen within the gradient energy vs. gamma correction factor chart 202 according to an example embodiment. As also shown in FIG. 2, the gamma correction factor (r) that resulted in this peak gradient energy 204 is equivalent to the value 1.1. Based on this gradient energy vs. gamma correction factor chart 202, the learning dynamic gamma-correction optimization system in an embodiment may determine the optimal gamma-correction factor for the pixels within the m×n grid that may generate the highest contrast between these pixels has a value of 1.1. If the gradient energy determination results in a value of zero, and this number does not change with the value of the gamma-correction factor (r), the learning dynamic gamma-correction optimization system in an embodiment may automatically assign a value of 1 to the gamma-correction factor (r).

Figure 3:
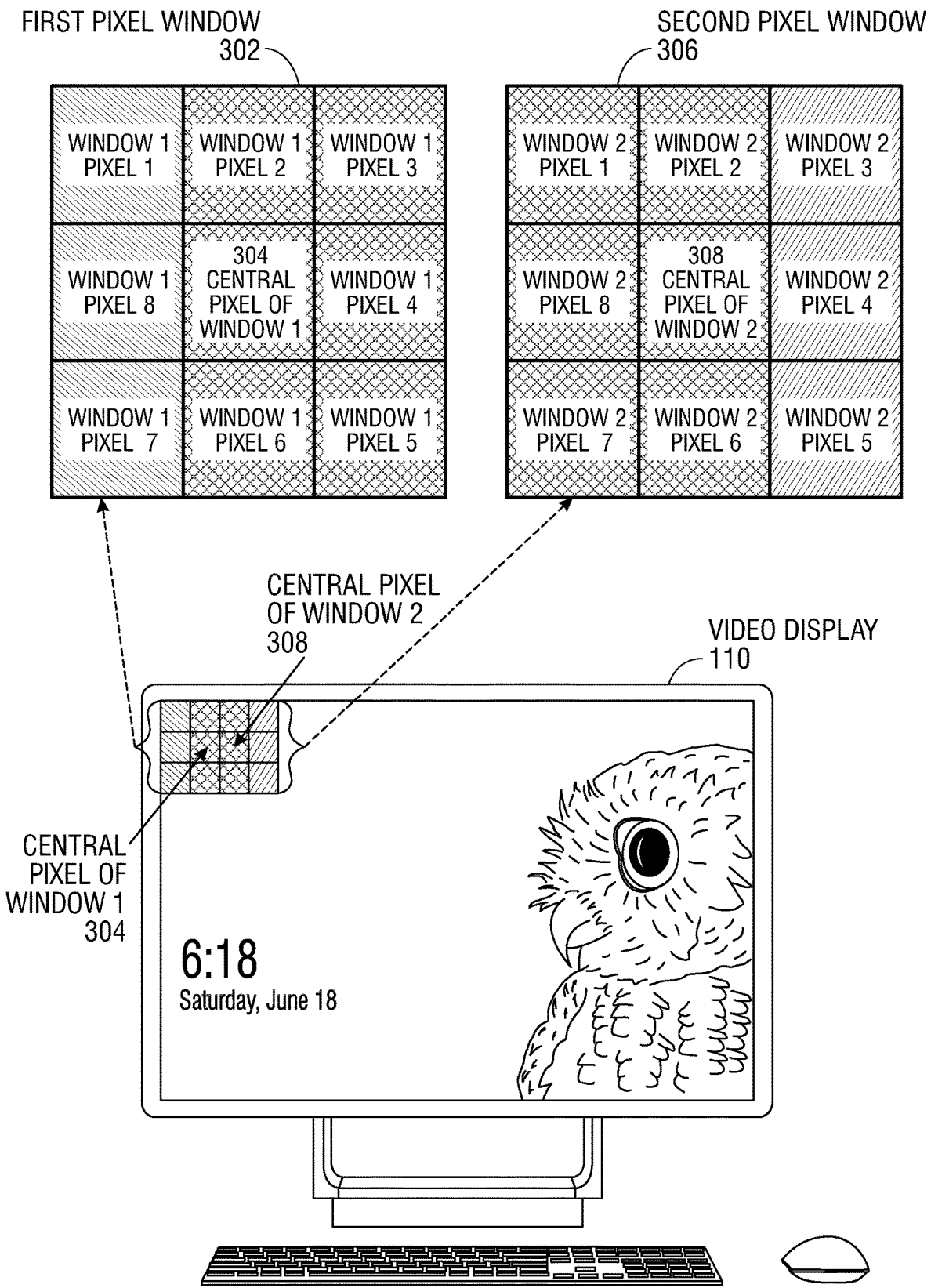
FIG. 3 is a block diagram of partitioning a plurality of pixels of a video display into a plurality of m×n pixel windows according to an embodiment of the present disclosure.

FIG. 3 is a block diagram showing partitioning a plurality of pixels of a video display into a plurality of m×n pixel windows across which gradient energies may be maximized according to an embodiment of the present disclosure. A video display 110 in an embodiment may be partitioned into a plurality of neighbor-eight pixel windows. For example, a first pixel window 302 may be located in the upper left-hand corner of the video display 110. The first pixel window 302 may be an m×n grid of pixels where m represents the number of pixels included across the x-axis and n represents the number of pixels included across the y-axis. For example, in an embodiment shown in FIG. 3, the first pixel window 302 may include a 3×3 grid of pixels such that m=3 and n=3. In other embodiments, m and n may be any odd number (e.g. 5 or 7).

The first pixel window 302 may include m×n number of pixels. In an embodiment in which m=3 and n=3, the first pixel window 302 may include a total of nine pixels. The central pixel in a given pixel window may be designated as P0. For example, the central pixel 304 of the first pixel window 302 may be designated as P0 for the first pixel window 302. The remaining pixels in a pixel window may be designated with numbers between one and a number equivalent to (m×n)−1. For example, in an embodiment in which m=3 and n=3, the remaining pixels in the first pixel window 302 may be designated with numbers between one and eight. As such, pixel windows in an embodiment in which m=3 and n=3 may be referred to herein as neighbor-eight pixel windows because they describe a pixel window of a central pixel and its eight nearest neighbors. The pixel designated by the number one in a neighbor-eight pixel window may be located at the top left-most corner of the neighbor-eight pixel window in an embodiment. The remaining pixels in such an embodiment may then be designated by numbers of increasing value, moving in a clockwise direction around the central pixel. For example, the pixel designated as pixel one (P1) in the first pixel window 302 may be located in the top left-most corner of the first pixel window 302. Further, the remaining pixels in the first pixel window 302 may be designated by numbers of increasing value, moving from pixel two (P2) directly above the central pixel 304 to pixel three (P3), pixel four (P4), pixel five (P5), pixel six (P6), pixel seven (P7), and pixel eight (P8) in a clockwise fashion around the central pixel 304.

The video display 110 may be similarly partitioned into a second pixel window 306, which may be defined as having the same m×n dimensions as the first pixel window 302, and as having a central pixel 308 located directly adjacent to the central pixel 304 of the first pixel window 302, as shown in FIG. 3. As such, some pixels falling within the first pixel window 302 may also fall within the second pixel window 306. For example, the first pixel (P1) of the second pixel window 306 may also fall within the first pixel window 302 as the third pixel (P3) of the first pixel window 302, the eighth pixel (P8) of the second pixel window 306 may also fall within the first pixel window 302 as the fourth pixel (P4) of the first pixel window 302, and the seventh pixel (P7) of the second pixel window 306 may also fall within the first pixel window 302 as the fifth pixel (P5) of the first pixel window 302. The entire video display 110 may be partitioned in such a way that every pixel of the video display 110 falls into at least one m×n dimensional neighbor-eight pixel window.

Each of the pixel windows into which the pixels of the video display 110 are partitioned in an embodiment may be used to determine a plurality of gradient energies across the pixel window based on a plurality of gamma-correction values, identify an optimal gamma-correction value resulting in the maximum gradient energy across those pixels, and to apply the optimal gamma-correction value identified to the R, G, and B intensity values associated with the central pixel of the neighbor-eight pixel window. If any of the pixels within the neighbor-eight pixel window are located on the borders of the video display 110 (e.g. top, bottom, left side, right side), a gamma-correction factor equivalent to one may be applied to the intensity values associated with those pixels. In other words, the R, G, and B intensity values associated with border pixels may not be gamma-corrected in an embodiment. By performing this same method for each central pixel in each neighbor-eight pixel window, and by applying a gamma-correction factor of one to each border pixel, each pixel of the video display 110 may be gamma-corrected using a gamma-correction factor resulting in maximum gradient energy between each central pixel and its nearest neighbors.

Figure 4:
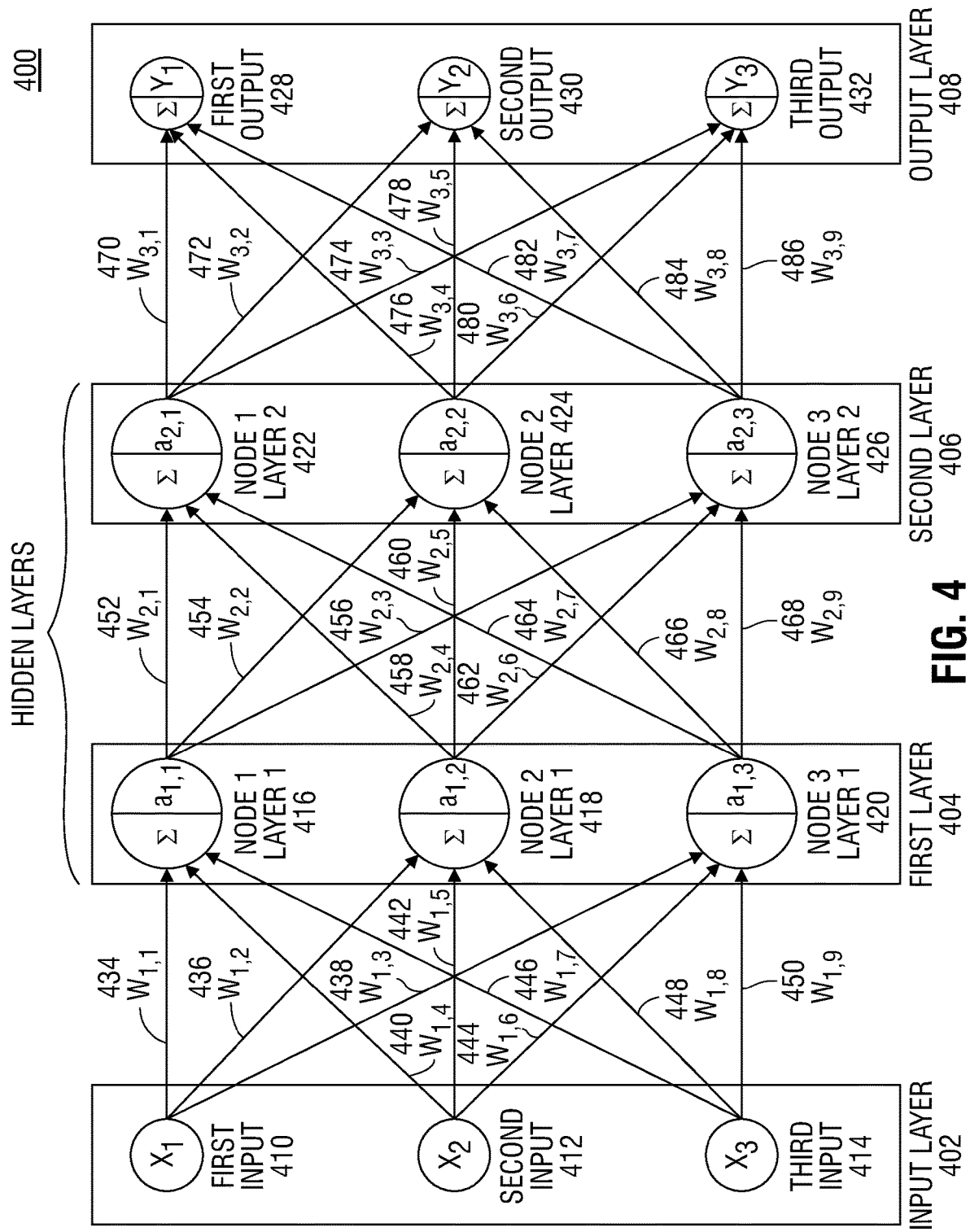
FIG. 4 is a block diagram illustrating a neural network according to an embodiment of the present disclosure.

FIG. 4 is a block diagram illustrating a generic neural network and weights describing the relationships between nodes in neighboring layers according to an embodiment of the present disclosure. A neural network 400 in an embodiment may model a series of consecutive decisions or determinations made based upon one or more input variables, where each of the decisions made impacts a later decision. Neural networks may include an input layer, one or more hidden layers, and an output layer. For example, the neural network 400 may include an input layer 402, two hidden layers including a first layer 404 and a second layer 406, and an output layer 408. In embodiments herein, neural network such as 400 may be trained and used to apply the optimal gamma correction factors to pixels in a pixel window such that inputs in the first layer 404 are processed through the hidden layers with adjusted weighting levels among nodes between layers to an output layer 408 with gamma corrected pixel values that may be applied to gamma correct pixels throughout images for display. Each layer of a neural network may include one or more nodes, which represent values of variables used to make a determination at each layer. For example, nodes within the input layer 402 may include first input node 410 having an input value $X_1$, second input node 412 having an input value $X_2$, and third input node 414 having an input value $X_3$. The values $X_1$, $X_2$, and $X_3$ of the input layer 402 may represent inputs to the neural network 400. Any number of inputs are contemplated depending on pixel window size, numbers of subpixel values, or other features. The variable X as used herein may apply only to input values given in the input layer in an embodiment. The input layer in an embodiment may include any number of inputs or nodes. For example, as described in greater detail below with respect to FIG. 6, the input layer may include all of the R, G, and B intensity values associated with each of the nine pixels in a 3×3 neighbor-eight window, giving a total of 27 input variables.

The hidden layers and the output layer in a neural network may represent a function applied to, or a determination made based upon the output of the previous layer. For example, the first layer 404 in an embodiment may include a first node 416, a second node 418, and a third node 420. Each of these nodes 416-420 in an embodiment may represent a function applied to an input at each of these nodes, resulting in an output (a) at each of these nodes. In addition, more than one node from a previous layer may serve as an input into any given node of the hidden layers and output layers. For example, as shown by the arrows connecting the nodes 410-414 of the input layer 402 to the nodes 416-420 of the first layer 404, it can be seen that each of the values of the nodes 410-414 of the input layer 402 serve as inputs to each of the values of the nodes 416-420 in the first layer 404. Because each of the nodes between these layers is interconnected, the input layer 402 and the first layer 404 may be referred to herein as fully connected. In other embodiments, one or more nodes of the first layer 404 may not receive inputs from each of the nodes of the first layer 404.

In embodiments where a node in a non-input layer receives inputs from a plurality of nodes in the input layer or a previous layer, each of the plurality of inputs may be summed as a first step in the determination modeled at that layer. For example, the first node 416 of the first layer 404 may receive inputs from the first input node 410, the second input node 412, and the third input node 414 in the input layer 402. The input into the first node 416 of the first layer 404 may be a function of each of the values associated with each of these input nodes and a weight variable describing the relationship between each of these inputs nodes 410-414 and the first node 416 of the first layer 404. A weight variable describing a relationship between two nodes may describe the degree to which the node in a given layer is impacted by the value of a connected node in a previous layer. For example, the weight variable $w_{1,1}$ 434 may describe the degree to which the input to the first node 416 of the first layer 404 is impacted by the value $X_1$ associated with the first input node 410, the weight variable $w_{1,4}$ 440 may describe the degree to which the input to the first node 416 of the first layer 404 is impacted by the value $X_2$ associated with the second input node 412, and the weight variable $w_{1,7}$ 446 may describe the degree to which the input to the first node 416 of the first layer 404 is impacted by the value $X_3$ associated with the third input node 414.

The input into a given node in a current layer from a single node in the previous layer in an embodiment may be equivalent to the output from the single node in the previous layer, multiplied by the weight variable associated with both the single node in the previous layer and the given node in the current layer. For example, the input into the first node 416 of the first layer 404 from the first input node 410 in the input layer 402 may be equivalent in an embodiment to the product of the value $X_1$ and the weight variable $w_{1,1}$ 434. Similarly, the input into the first node 416 of the first layer 404 from the second input node 410 may be equivalent to the product of the value $X_2$ and the weight variable $w_{1,4}$ 440, and the input into the first node 416 of the first layer 404 from the third input node 416 may be equivalent to the product of the value $X_3$ and the weight variable $w_{1,7}$ 446. As a first step in the determination modeled by the first node 416 in the first layer 404, each of the inputs of the first input 410, the second input 412, and the third input 414 may be summed to give a value equivalent to $(X_1 \times w_{1,1}) + (X_2 \times w_{1,4}) + (X_3 \times w_{1,7})$. This summation step may be described in an embodiment by the symbol $\Sigma$, and may be applied at each non-input layer.

The output of each non-input layer node may be referred to herein as an activation, and may be represented by a value $a_{i,j}$ where i represents the layer number, and j represents the number of the node in a given layer. For example, the activation for the first node 416 in the first layer 404 may be represented by $a_{1,1}$, while the activation for the third node 420 in the first layer 404 may be represented by $a_{1,3}$. The activation may result from the application of the process or determination modeled by the current layer on the summation of each of the inputs from the nodes of the previous layer to the current layer. For example, the activation $a_{1,1}$ of the first node 416 in the first layer 404 may result from the application of the process or determination modeled by the first node 416 of the first layer 404 on the summation $(X_1 \times w_{1,1}) + (X_2 \times w_{1,4}) + (X_3 \times w_{1,7})$ of the inputs from the input layer 402 to the first node 416 in the first layer 404. In a similar fashion, the activation values $a_{1,2}$ of the second node 418 in the first layer 404, and $a_{1,3}$ of the third node 420 in the first layer 404 may also be determined.

A neural network may contain any number of hidden layers in an embodiment. For example, the neural network 400 may include two hidden layers (e.g. first layer 404 and second layer 406). In other embodiments, as described with reference to FIG. 6, the neural network may include m number of hidden layers, where m describes the number of pixels included across the x-axis of a partitioned pixel window (e.g. three for a 3×3 pixel window). The neural network 400 may include a second layer 406 in an embodiment, including a first node 422, a second node 424, and a third node 426. The first layer 404 and the second layer 406 in an embodiment may be fully connected such that the activations $a_{2,1}$, $a_{2,2}$, and $a_{2,3}$ of each of the first node 422, the second node 424, and the third node 426 of the second layer 406 respectively, may be a function of the summation of the activations from each of the nodes 416-420 of the previous layer (e.g. the first layer 404), given by the values $a_{1,1}$, $a_{1,2}$, and $a_{1,3}$.

The neural network 400 may further include an output layer 408, including a first output node 428 having an output value $Y_1$, a second output node 430 having an output value $Y_2$, and a third output node 432 having an output value $Y_3$. The second layer 406 and the output layer 408 in an embodiment may also be fully connected such that the activations $Y_1$, $Y_2$, and $Y_3$ of each of the first output node 428, the second output node 430, and the third output node 432 of the output layer 408 respectively, may be a function of the summation of the activations from each of the nodes 422-426 of the previous layer (e.g. the second layer 406), given by the values $a_{2,1}$, $a_{2,2}$, and $a_{2,3}$.

The output of any given node in a neural network may be a function of each of the inputs to that node and a weight describing the relationship between the given node and each of the nodes in the previous layer supplying inputs to the given node. For example, the output or activation of the first node 416 in the first layer 404 in an embodiment may be said to be a function of the inputs $X_1$, $X_2$, and $X_3$ from the nodes 410-414 of the input layer 402, and of weight values describing the relationship between the first node 416 of the first layer 404 and each of the nodes 410-414 of the input layer 402. A weight value may take the form $w_{l,k}$ where l represents the number of the previous layer, and k represents a numerical identification of a given weight, where k falls between one and the number of total inputs to the current layer. In a fully connected relationship between a current layer (l+1) having b nodes and a previous layer l having c nodes, the maximum value for the variable k would have the value b×c, because each of the b nodes would receive c number of inputs. For example, in neural network 400, the input layer 402 has three nodes (e.g. c=3), and the first layer 404 has three nodes (e.g. b=4), such that the maximum value for the variable k is equivalent to nine (e.g. 3×3).

As such, there may be a total of nine weights in such an embodiment, describing the relationships between each of the three nodes of the first layer 404 and each of the three nodes of the input layer 402. For example, the relationship between the first node 416 of the first layer 404 (l+1) and the first input node 410 of the input layer 402 (l) may be represented by the weight $w_{1,1}$ 434, the relationship between the second node 418 of the first layer 404 and the first input node 410 of the input layer 402 may be represented by the weight $w_{1,2}$ 436, and the relationship between the third node 420 of the first layer 404 and the first input node 410 of the input layer 402 may be represented by the weight $w_{1,3}$ 436. In another example, the relationship between the first node 416 of the first layer 404 (l+1) and the second input node 412 of the input layer 402 (l) may be represented by the weight $w_{1,4}$ 440, the relationship between the second node 418 of the first layer 404 and the second input node 412 of the input layer 402 may be represented by the weight $w_{1,5}$ 442, and the relationship between the third node 420 of the first layer 404 and the second input node 412 of the input layer 402 may be represented by the weight $w_{1,6}$ 444. In yet another example, the relationship between the first node 416 of the first layer 404 (l+1) and the third input node 414 of the input layer 402 (l) may be represented by the weight $w_{1,7}$ 446, the relationship between the second node 418 of the first layer 404 and the third input node 414 of the input layer 402 may be represented by the weight $w_{1,8}$ 448, and the relationship between the third node 420 of the first layer 404 and the third input node 414 of the input layer 402 may be represented by the weight $w_{1,9}$ 450.

As described herein, the input into a given node in a current layer from a single node in the previous layer in an embodiment may be equivalent to the output from the single node in the previous layer, multiplied by the weight variable associated with both the single node in the previous layer and the given node in the current layer. For example, the input into the second node 418 of the first layer 404 from the first input node 410 in the input layer 402 may be equivalent in an embodiment to the product of the value $X_1$ and the weight variable $w_{1,2}$ 436. As another example, the input into the second node 418 of the first layer 404 from the second input node 410 may be equivalent to the product of the value $X_2$ and the weight variable $w_{1,5}$ 442, and the input into the second node 418 of the first layer 404 from the third input node 416 may be equivalent to the product of the value $X_3$ and the weight variable $w_{1,8}$ 448. As yet another example, the input into the third node 420 of the first layer 404 from the first input node 410 in the input layer 402 may be equivalent in an embodiment to the product of the value $X_1$ and the weight variable $w_{1,3}$ 438, the input into the third node 420 of the first layer 404 from the second input node 410 may be equivalent to the product of the value $X_2$ and the weight variable $w_{1,6}$ 444, and the input into the third node 420 of the first layer 404 from the third input node 416 may be equivalent to the product of the value $X_3$ and the weight variable $w_{1,9}$ 450.

Because the three nodes of the first layer 404 are also fully connected to the three nodes of the second layer 406, there may be a total of nine weights between the first layer 404 and the second layer 406 in such an embodiment. For example, the relationship between the first node 416 of the first layer 404 (l) and the first input node 422 of the second layer 406 (l+1) may be represented by the weight $w_{2,1}$ 452, the relationship between the first node 416 of the first layer 404 (l) and the second node 424 of the second layer 406 (l+1) may be represented by the weight $w_{2,2}$ 454, and the relationship between the first node 416 of the first layer 404 (l) and the third input node 426 of the second layer 406 (l+1) may be represented by the weight $w_{2,3}$ 456. In another example, the relationship between the second node 418 of the first layer 404 (l) and the first input node 422 of the second layer 406 (l+1) may be represented by the weight $w_{2,4}$ 458, the relationship between the second node 418 of the first layer 404 (l) and the second node 424 of the second layer 406 (l+1) may be represented by the weight $w_{2,5}$ 460, and the relationship between the second node 418 of the first layer 404 (l) and the third input node 426 of the second layer 406 (l+1) may be represented by the weight $w_{2,6}$ 462. As yet another example, the relationship between the third node 420 of the first layer 404 (l) and the first input node 422 of the second layer 406 (l+1) may be represented by the weight $w_{2,7}$ 464, the relationship between the third node 420 of the first layer 404 (l) and the second node 424 of the second layer 406 (l+1) may be represented by the weight $w_{2,8}$ 466, and the relationship between the third node 420 of the first layer 404 (*l*) and the third input node 426 of the second layer 406 (*l*+1) may be represented by the weight $w_{2,9}$ 468.

Because the three nodes of the second layer 406 are also fully connected to the three nodes of the output layer 408, there may be a total of nine weights between the second layer 406 and the output layer 408 in such an embodiment. For example, the relationship between the first node 422 of the second layer 406 (*l*) and the first output node 428 of the output layer 408 (*l*+1) may be represented by the weight $w_{3,1}$ 470, the relationship between the first node 422 of the second layer 406 (*l*) and the second output node 430 of the output layer 408 (*l*+1) may be represented by the weight $w_{3,2}$ 472, and the relationship between the first node 422 of the second layer 406 (*l*) and the third output node 432 of the output layer 408 (*l*+1) may be represented by the weight $w_{3,3}$ 474. As another example, the relationship between the second node 424 of the second layer 406 (*l*) and the first output node 428 of the output layer 408 (*l*+1) may be represented by the weight $w_{3,4}$ 476, the relationship between the second node 424 of the second layer 406 (*l*) and the second output node 430 of the output layer 408 (*l*+1) may be represented by the weight $w_{3,5}$ 478, and the relationship between the second node 422 of the second layer 406 (*l*) and the third output node 432 of the output layer 408 (*l*+1) may be represented by the weight $w_{3,6}$ 480. As yet another example, the relationship between the third node 426 of the second layer 406 (*l*) and the first output node 428 of the output layer 408 (*l*+1) may be represented by the weight $w_{3,7}$ 482, the relationship between the third node 426 of the second layer 406 (*l*) and the second output node 430 of the output layer 408 (*l*+1) may be represented by the weight $w_{3,8}$ 484, and the relationship between the third node 426 of the second layer 406 (*l*) and the third output node 432 of the output layer 408 (*l*+1) may be represented by the weight $w_{3,9}$ 486.

As described herein, the input into a given node in a current layer from a single node in the previous layer in an embodiment may be equivalent to the output from the single node in the previous layer, multiplied by the weight variable associated with both the single node in the previous layer and the given node in the current layer. For example, the input into the first output node 428 from the first node 422 from the second layer 406 in an embodiment may be equivalent to the output value $a_{2,1}$ from the first node 422 of the second layer 406 multiplied by the weight $w_{3,1}$ 470, the input into the first output node 428 from the second node 424 from the second layer 406 in an embodiment may be equivalent to the output value $a_{2,2}$ from the second node 424 of the second layer 406 multiplied by the weight $w_{3,4}$ 476, and the input into the first output node 428 from the third node 426 from the second layer 406 in an embodiment may be equivalent to the output value $a_{2,3}$ from the third node 426 of the second layer 406 multiplied by the weight $w_{3,7}$ 482. Thus, the total input to the first output node 428 may be a function of $a_{2,1}$, $w_{3,1}$ 470, $a_{2,2}$, $w_{3,4}$ 476, $a_{2,3}$, and $w_{3,7}$ 482. Similarly, the total input to the first node 422 of the second layer 406 which results in the output $a_{2,1}$ is a function of $a_{1,1}$, $w_{2,1}$ 452, $a_{1,2}$, $w_{2,4}$ 458, $a_{1,3}$, and $w_{2,7}$ 464. Also similarly, the total input to the first node 416 of the first layer 404 which results in the output $a_{1,1}$ is a function of $X_1$, $w_{1,1}$ 434, $X_2$, $w_{1,4}$ 440, $X_3$, and $w_{1,7}$ 446. Because of these interdependencies, the values associated with each output node 428-432 is a function of each of the values associated with the input nodes 410-414, and each of the weights 434-486 between each of the nodes of each of the layers. Thus, the values of each of the outputs of the neural network may be altered by altering only one or more of the weights between the nodes of the layers.

It is understood that neural network 400 is an example neural network which is simplified for explanation. It will be appreciated that a neural network with any plurality of inputs and required output values may be constructed to be used with the training mode and working mode of the learning dynamic gamma-correction optimization system described in various embodiments herein.

Figure 5:
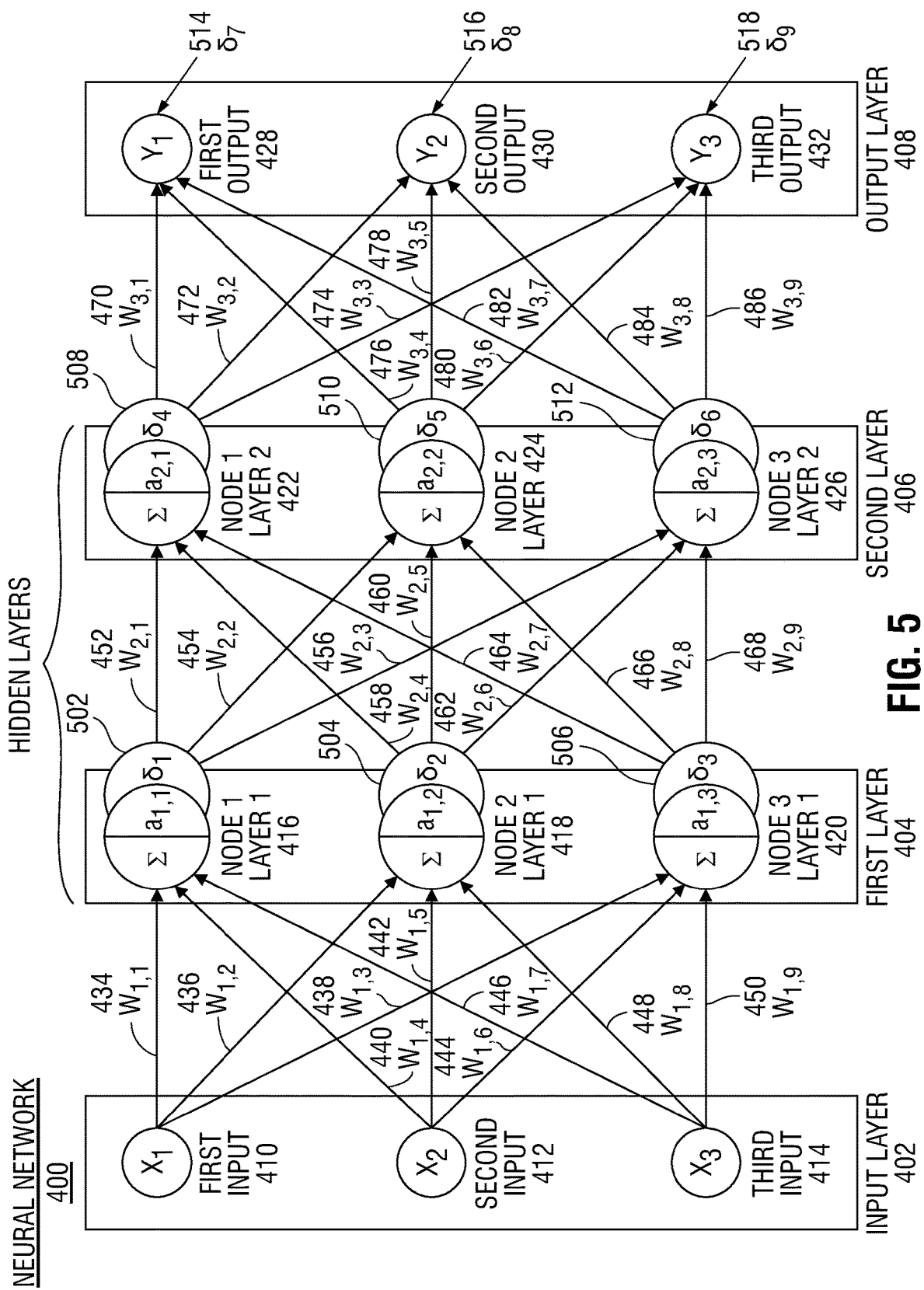
FIG. 5 is a block diagram illustrating a neural network according to another embodiment of the present disclosure.

FIG. 5 is a block diagram illustrating a generic neural network and error signals propagated between nodes in neighboring layers according to an embodiment of the present disclosure. The values of the output nodes in a neural network may not be equivalent to ideal or expected output values in an embodiment. This difference may be due to an error made at one or more nodes of hidden layers of the neural network. For example, an error signal 61 may be generated in an embodiment at the first node 416 of the first layer 404. This may be caused, for example, by assigning an incorrect value to any of the weights 434, 440, and 446 between the first node 416 of the first layer 404 and one of the first input node 410, second input node 412, or third input node 414 of the input layer 402. In other words, assuming the input values $X_1$, $X_2$, and $X_3$ are correct, assigning an incorrect value to the weights 434, 440, or 446 could cause an error $\delta_1$ 502 in the determination of the activation value $a_{1,2}$ at the first node 416 of the first layer 404. Similarly, assigning an incorrect value to the weights 436, 442, or 448 could cause an error $\delta_2$ 504 in the determination of the activation value $a_{1,2}$ at the second node 418 of the first layer 404, and assigning an incorrect value to the weights 438, 444, or 450 could cause an error $\delta_3$ 506 in the determination of the activation value $a_{1,3}$ at the third node 420 of the first layer 404.

In operation of the learning dynamic gamma-correction optimization system described in various embodiments herein, an assumption during training mode provides for a uniform weighting factor to be applied for the input original pixel values. This in comparison with an expected output from the application of a preferred gamma correction such as that generated by a peak energy gradient determination may be used to determine error signals according to some embodiments. Further, weighting adjustments may be used to minimize errors or error cost as described in embodiments herein to train the neural network to apply an optimal gamma correction to pixels as desired to achieve a particular color scheme. This neural network framework with adjusted weight matrix values may then be transmitted for working mode usage of the learning dynamic gamma-correction optimization system during display of optimal gamma corrected images by display devices according to a desired color scheme.

The error signal generated at each node in a hidden layer propagates forward to cause errors in determinations made at later layers, since the determinations made at later layers depend upon determinations made at earlier layers. For example, if the activation $a_{1,1}$ in an embodiment is erroneous by the value $\delta_1$ 502, the activation $a_{1,2}$ is erroneous by the value $\delta_2$ 504, and the activation $a_{1,3}$ is erroneous by the value $\delta_3$ 506, the values of $a_{2,1}$ at the first node 422 of the second layer 406, $a_{2,2}$ at the second node 424 of the second layer 406, and $a_{2,3}$ at the third node 426 of the second layer 406 may also be erroneous by some degree because each of the values of $a_{2,1}$, $a_{2,2}$, and $a_{2,3}$ are functions of each of the values of $a_{1,1}$, $a_{1,2}$, and $a_{1,3}$. Thus, errors in determining the activation values of the nodes 416-420 of the first layer 404 may cause an error signal $\delta_4$ 508 to occur at the first node 422 of the second layer 506, an error signal $\delta_5$ 510 to occur at the second node 424 of the second layer 506, and an error signal $\delta_6$ 512 to occur at the third node 426 of the second layer 506.

As another example, if the activation $a_{2,1}$ in an embodiment is erroneous by the value $\delta_4$ 508, the activation $a_{2,2}$ is erroneous by the value $\delta_5$ 510, and the activation $a_{2,3}$ is erroneous by the value $\delta_6$ 512, the values of $Y_1$ at the first output node 428 of the output layer 408, $Y_2$ at the second output node 430 of the output layer 408, and $Y_3$ at the third output node 432 of the output layer 408 may also be erroneous by some degree because each of the values of $Y_1$, $Y_2$, and $Y_3$ are functions of each of the values $a_{2,1}$, $a_{2,2}$, and $a_{2,3}$. Thus, errors in determining the activation values of the nodes 422-426 of the second layer 406 may cause an error signal $\delta_7$ 514 to occur at the first output node 428 of the output layer 408, an error signal $\delta_8$ 516 to occur at the second output node 430 of the output layer 408, and an error signal $\delta_9$ 518 to occur at the third output node 432 of the output layer 408.

The neural network 400 in an embodiment may be used to forward propagate an array of input values (e.g. $X_1$, $X_2$, and $X_3$) through the hidden layers using initial weighting values in order to output a first guess or estimate of an array of initial output values (e.g. $Y_1$, $Y_2$, and $Y_3$). As described herein, the output values (e.g. $Y_1$, $Y_2$, and $Y_3$) in an embodiment may be altered by altering the weighting values between each of the nodes. Thus, if optimal values for these output values are known, the weighting values may be adjusted in order to drive the neural network 400 to output such optimal values. For example, the application of optimal gamma correction for peak gradient values of a central pixel relative to neighbor eight pixels may be used as a baseline optimal set of output values. Determination of weighting values likely to drive the neural network 400 to output such optimal values may be referred to herein as back propagation. This back propagation with adjustments to weighting values to generate a weight value matrix provides for a trained neural network framework which can be used to optimally gamma correct a pixel.

A back propagation process in an embodiment may begin by comparing the initial output values (e.g. $Y_1$, $Y_2$, and $Y_3$) to known optimal output values $Y_1'$, $Y_2'$, and $Y_3'$, respectively. The known optimal output values in an embodiment may be based on a user-selected color scheme. A user in an embodiment may select from a plurality of available color schemes, including, for example, a high-contrast color scheme, a high-saturation color scheme, or a high-brightness color scheme. A high-contrast color scheme in an embodiment may be a color scheme associated with a gamma-correction factor known to maximize the gradient energy across a given pixel window. The high-contrast color scheme may be determined, for example, by identifying the optimal gamma-correction factor known to maximize the gradient energy across a pixel window, and applying that optimal gamma-correction factor to output optimally gamma-corrected R, G, and B intensity values for each of the pixels in the pixel window, as described above with respect to FIGS. 2-3. A high brightness color scheme in an embodiment may be a color scheme in which the red, green, and/or blue intensity values associated with the sub-pixels of a given pixel are all increased from their initial values in either a linear fashion, or by increasing the gamma-correction value for every pixel in a video display. A high-saturation color scheme in an embodiment may be a color scheme in which the red, green, and/or blue intensity values associated with the sub-pixels of a given pixel are altered to maximize the saturation between the red, green, and blue intensity values of that sub-pixel.

Error signals associated with each of the nodes of the output layer 408 in an embodiment may be determined by comparing the initial output values to the known optimal output values. Thus, the error signal $\delta_7$ 514 associated with the first output node 428 of the output layer 408 may be equivalent to $Y_1-Y_1'$, an error signal $\delta_8$ 516 associated with the second output node 430 of the output layer 408 may be equivalent to $Y_2-Y_2'$, and an error signal $\delta_9$ 518 associated with the third output node 432 of the output layer 408 may be equivalent to $Y_3-Y_3'$.

As described herein, the error signal at a given node of a current layer may be a function of the error signals of each of the nodes of the previous layer that provide inputs to the node of the current layer. The relationship between the error signal at a given node (i) in a current layer (l) to a node (j) in a previous layer (l−1) in an embodiment may be given by the equation, where $w_{i,j}$ represents the weighting value between the node i and the node j:

$$\delta_i^l = \sum_{j=1}^{N} w_{ij}^l \delta_j^{l-1} \qquad (6)$$

For example, the error signal $\delta_7$ 514 associated with the first output node 428 of the output layer 408 in an embodiment may be related to the error signals $\delta_4$ 508, $\delta_5$ 510, $\delta_6$ 512 associated with the first node 422, second node 424, and third node 426 of the second layer 406, respectively according to the equation:

$$\delta_7 = w_{3,1}\delta_4 + w_{3,4}\delta_5 + w_{3,7}\delta_6 \qquad (7)$$

As another example, the error signal $\delta_8$ 516 associated with the second output node 430 of the output layer 408 in an embodiment may be related to the error signals $\delta_4$ 508, $\delta_5$ 510, $\delta_6$ 512 associated with the first node 422, second node 424, and third node 426 of the second layer 406, respectively according to the equation:

$$\delta_8 = w_{3,2}\delta_4 + w_{3,5}\delta_5 + w_{3,8}\delta_6 \qquad (8)$$

As yet another example, the error signal $\delta_9$ 518 associated with the third output node 432 of the output layer 408 in an embodiment may be related to the error signals $\delta_4$ 508, $\delta_5$ 510, $\delta_6$ 512 associated with the first node 422, second node 424, and third node 426 of the second layer 406, respectively according to the equation:

$$\delta_9 = w_{3,3}\delta_4 + w_{3,6}\delta_5 + w_{3,9}\delta_6 \qquad (9)$$

As described herein, each of the weighting values (e.g. 470-486) in the neural network 400 may have been given an initial preset value. For example, the weights $w_{3,1}$ 470, $w_{3,2}$ 472, $w_{3,3}$ 474, $w_{3,4}$ 476, $w_{3,5}$ 478, $w_{3,6}$ 480, $w_{3,7}$ 482, $w_{3,8}$ 484, and $w_{3,9}$ 486 may each be given a value of one for the initial forward propagation process used to output the initial output values $Y_1$, $Y_2$, and $Y_3$. As such, each of those weighting values 470-486 may be known. Further, each of the values for the error signals $\delta_7$ 514, $\delta_8$ 516, and $\delta_9$ 518 associated with the first output node 428, second output node 430, and third output node 432 may also be known to be equivalent to the difference between the initial output values and optimal output values for each of these nodes. Thus, three equations 7-9, and three unknown variables including the error signals $\delta_4$ 508, $\delta_5$ 510, $\delta_6$ 512 associated with the first node 422, second node 424, and third node 426 of the second layer 406 remain. These three equations 7-9 may then be used to determine the error signals $\delta_4$ 508, $\delta_5$ 510, $\delta_6$ 512 associated with the first node 422, second node 424, and third node 426 of the second layer 406.

The error signals $\delta_4$ 508, $\delta_5$ 510, and $\delta_6$ 512 associated with the first node 422, the second node 424, and the third node 426 of the second layer 406, respectively, in an embodiment may then be used in a similar fashion to determine the error signals $\delta_1$ 502, $\delta_2$ 504, and $\delta_3$ 506 associated with the first node 416, second node 418, and third node 420 of the first layer 404, respectively. For example, the error signal $\delta_4$ 508 associated with the first output node 422 of the second layer 406 in an embodiment may be related to the error signals $\delta_1$ 502, $\delta_2$ 504, and $\delta_3$ 506 associated with the first node 416, second node 418, and third node 420 of the first layer 404, respectively according to the equation:

$$\delta_4 = w_{2,1}\delta_1 + w_{2,4}\delta_2 + w_{2,7}\delta_3 \quad (10)$$

As another example, the error signal $\delta_5$ 510 associated with the second output node 424 of the second layer 406 in an embodiment may be related to the error signals $\delta_1$ 502, $\delta_2$ 504, and $\delta_3$ 506 associated with the first node 416, second node 418, and third node 420 of the first layer 404, respectively according to the equation:

$$\delta_5 = w_{2,2}\delta_1 + w_{2,5}\delta_2 + w_{2,8}\delta_3 \quad (11)$$

As yet another example, the error signal $\delta_6$ 512 associated with the third output node 426 of the second layer 406 in an embodiment may be related to the error signals $\delta_1$ 502, $\delta_2$ 504, and $\delta_3$ 506 associated with the first node 416, second node 418, and third node 420 of the first layer 404, respectively according to the equation:

$$\delta_6 = w_{2,3}\delta_1 + w_{2,6}\delta_2 + w_{2,9}\delta_3 \quad (12)$$

Similarly to each of the weights between the second layer 406 and the output layer 408, each of the weighting values 452-468 between the first layer 404 and the second layer 406 may be known. Further, each of the values for the error signals $\delta_4$ 508, $\delta_5$ 510, and $\delta_6$ 512 associated with the first node 422, second node 424, and third node 426 of the second layer 406 may also be known as determined using equations 7-9 above. Thus, three equations 10-12 and three unknown variables including the error signals $\delta_1$ 502, $\delta_2$ 504, and $\delta_3$ 506 associated with the first node 416, second node 418, and third node 420 of the first layer 504 may remain. These three equations 10-12 may then be used to determine the error signals $\delta_1$ 502, $\delta_2$ 504, and $\delta_3$ 506 associated with the first node 416, second node 418, and third node 420 of the first layer 504. In such a way, each of the values for each of the error signals at every node of the neural network 400 may be determined.

As described, it will be understood that neural network 400 shown in FIG. 5 is also an example neural network which is simplified for explanation. It will be appreciated that a neural network with any plurality of inputs and required output values may be constructed to be used with the training mode and working mode of the learning dynamic gamma-correction optimization system described in various embodiments herein. FIG. 5 further provides explanation of the operation of the error signals within the neural network framework for various embodiments herein.

Figure 6:
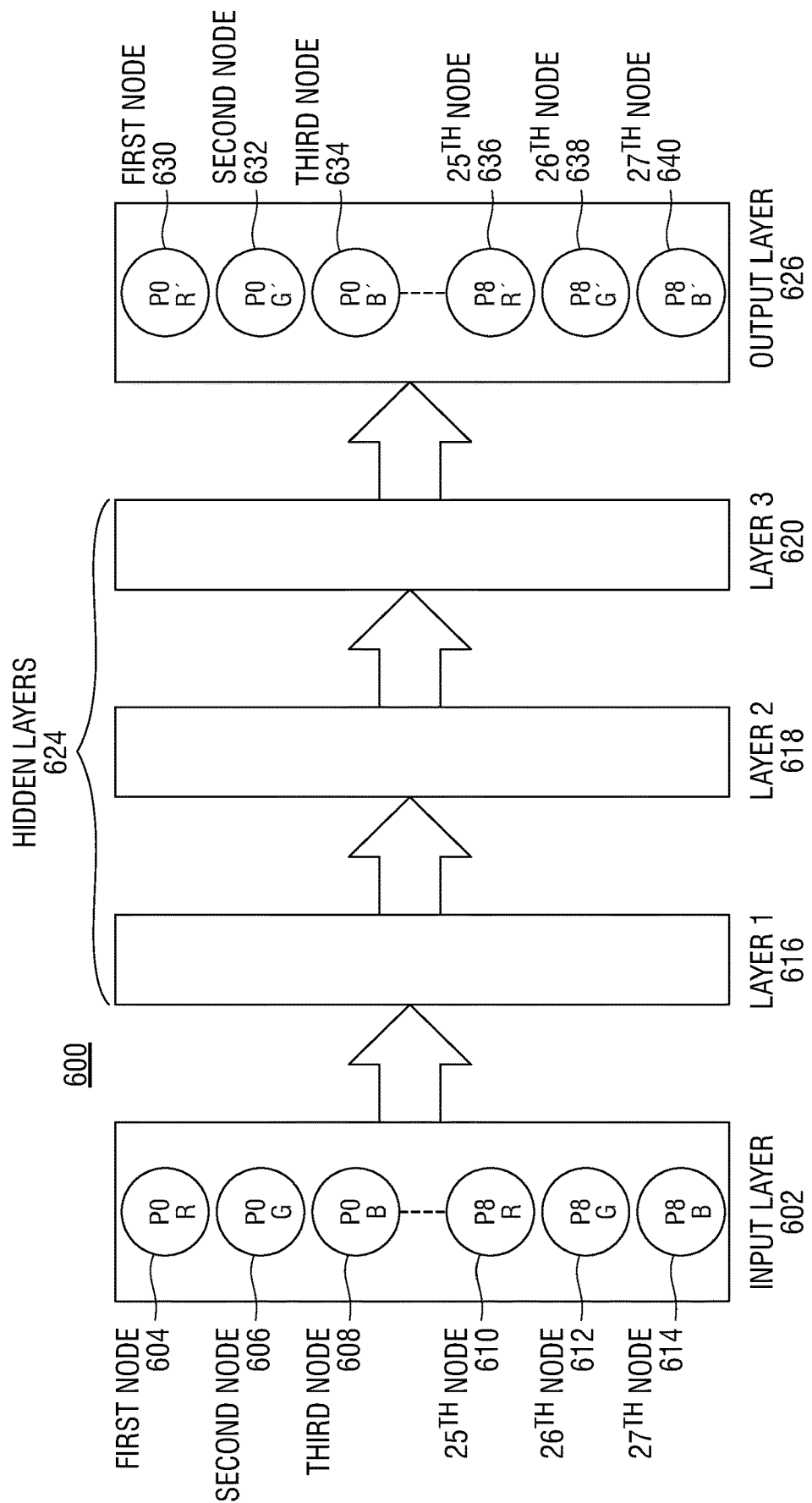
FIG. 6 is a block diagram of a neural network modeling determination of an optimal gamma-correction factor for a pixel of a video display according to an embodiment of the present disclosure.

FIG. 6 is a block diagram of a neural network the learning dynamic gamma-correction optimization system may use to model the determinations of an optimal gamma-correction factor for a central pixel within a video display according to an embodiment of the present disclosure. A neural network 600 may be used in an embodiment to determine an array of output values based on an array of input values. For example, the neural network 600 in an embodiment may include an input layer 602 including an array of input nodes representing R, G, and B intensity values associated in an HDR image data with a number of pixels within an m×n pixel window.

The number of input nodes in the input layer 602 in an embodiment may be depend on the numbers within the m×n pixel window. For example, in an example embodiment described with reference to FIG. 3 above in which the m×n pixel window measures 3×3 pixels for a total of nine pixels, there may be 27 input nodes. In other embodiments, the variables m, and n may have any odd number value, including for example, five, or seven. In an embodiment in which the variables m, and n have a value of five, the number of nodes in the input layer 602 may be 75 (e.g. 25 pixels, each having three sub-pixels). In an embodiment in which the variables m, and n have a value of seven, the number of nodes in the input layer 602 may be 147 (e.g. 49 pixels, each having three sub-pixels).

Each of the 27 nodes of the input layer 602 in such an embodiment may have a value associated within a non-gamma-corrected HDR image with one of three sub-pixels (e.g. R, G, or B sub-pixels) within one of the nine pixels within the pixel window. For example, the input layer 602 may include a first node 604 having a value associated within a non-gamma-corrected HDR image with the red (R) sub-pixel for the central pixel (P0) within the pixel window. As another example, the input layer 602 may include a second node 606 and a third node 608, each having a value associated respectively within a non-gamma-corrected HDR image with the green (G) sub-pixel and the blue (B) sub-pixel for the central pixel (P0) within the pixel window. As yet another example, the input layer 602 may include a 25th node 610, a 26th node 612 and a 27th node 614, each having a value associated respectively within a non-gamma-corrected HDR image with the red (R) sub-pixel, green (G) sub-pixel, and the blue (B) sub-pixel for the pixel (P8) located directly to the left of the central pixel (P0) within the pixel window. The input layer 602 in such an embodiment may further include fourth through 24th nodes (not shown) having values associated within a non-gamma-corrected HDR image with the sub-pixels for each of the remaining pixels (e.g. P(1)-P(7)) of the pixel window.

The neural network 600 may further include a plurality of hidden layers 624. Any number of hidden layers 624 may be used in an embodiment. In other embodiments, the number of hidden layers 624 may be equivalent to the width of the pixel window. For example, in an embodiment in which the pixel window measures 3×3 pixels, the neural network 600 may include three hidden layers (e.g. a first layer 616, a second layer 618, and a third layer 620). Each of these hidden layers 616-620 in such an embodiment may further include the same number of nodes as the input layer 602 (e.g. 27 nodes). In still other embodiments, the plurality of hidden layers 624 may be three, regardless of the size of the pixel window.

The neural network 600 may also include an output layer 626 having the same number of nodes as the immediately preceding hidden layer. In an example embodiment in which the pixel window measures 3×3 pixels and the third layer 620 includes 27 nodes, the output layer 626 may also include 27 nodes. For example, the first node 630 of the output layer 626 in such an embodiment may have an output value equivalent to an initially gamma-corrected intensity value associated with the red (R) sub-pixel for the central pixel (P0) of the 3×3 pixel window. As another example, the second node 632, and third node 634 of the output layer 626 in such an embodiment may have output values equivalent to initially gamma-corrected intensity values associated, respectively, with the green (G) sub-pixel, and blue (B) sub-pixel for the central pixel (P0) of the 3×3 pixel window. As yet another example, the 25th node 636, 26th node 638, and 27th node 640 of the output layer 626 in such an embodiment may have output values equivalent to initially gamma-corrected intensity values associated, respectively, with the red (R) sub-pixel, green (G) sub-pixel, and blue (B) sub-pixel for the pixel (P8) located directly to left of the central pixel (P0) within the 3×3 pixel window. The output layer 626 in such an embodiment may further include fourth through 24th nodes (not shown) having output values equivalent to initially gamma-corrected intensity values for the sub-pixels for each of the remaining pixels (e.g. P(1)-P(7)) of the pixel window. Each of the layers of the neural network 600 in an embodiment may be fully connected such that each node of a current layer depends on the values of the each of the nodes in the previous layer.

The neural network 600 in an embodiment may be used to perform methods similar to those described above with reference to the neural network 400 of FIGS. 4 and 5 above. For example, the neural network 600 in an embodiment may be used to forward propagate the values associated with the input nodes 604-614 (as well as the input nodes not shown in FIG. 6 associated with the pixels P(1)-P(7) of the pixel window) through the hidden layers 624 in order to determine the initially gamma-corrected intensity values of nodes 630-640 (as well as the output nodes not shown in FIG. 6 associated with the pixels P(1)-P(7) of the pixel window). This forward propagation in an embodiment may be executed after assigning initial values (e.g. one) to each of the weighting values between each of the nodes of each of the layers of the neural network 600, as described above with reference to FIG. 5.

As another example, error signals associated with each of the output nodes 630-640 (as well as the output nodes not shown in FIG. 6) may be determined by taking the difference between the initially gamma-corrected intensity value associated with each sub-pixel within the pixel window and the optimally gamma-corrected intensity value associated with the same sub-pixel, as described in an embodiment above with reference to FIG. 5. The optimally gamma-corrected intensity value in such an embodiment may have been determined using the method described in an embodiment with reference to FIGS. 2 and 3 above.

As yet another example, error signals associated with each of the nodes of each of the hidden layers 624 in an embodiment may be determined using the back propagation method described above in an embodiment with reference to FIG. 5. Once the error signals associated with each of the nodes of the hidden layers 624 are known in an embodiment, a gradient descent method may be used to identify an optimal weight for each of the weighting values between each of the nodes of the neural network 600, as described below with reference to FIG. 10.

Figure 7:
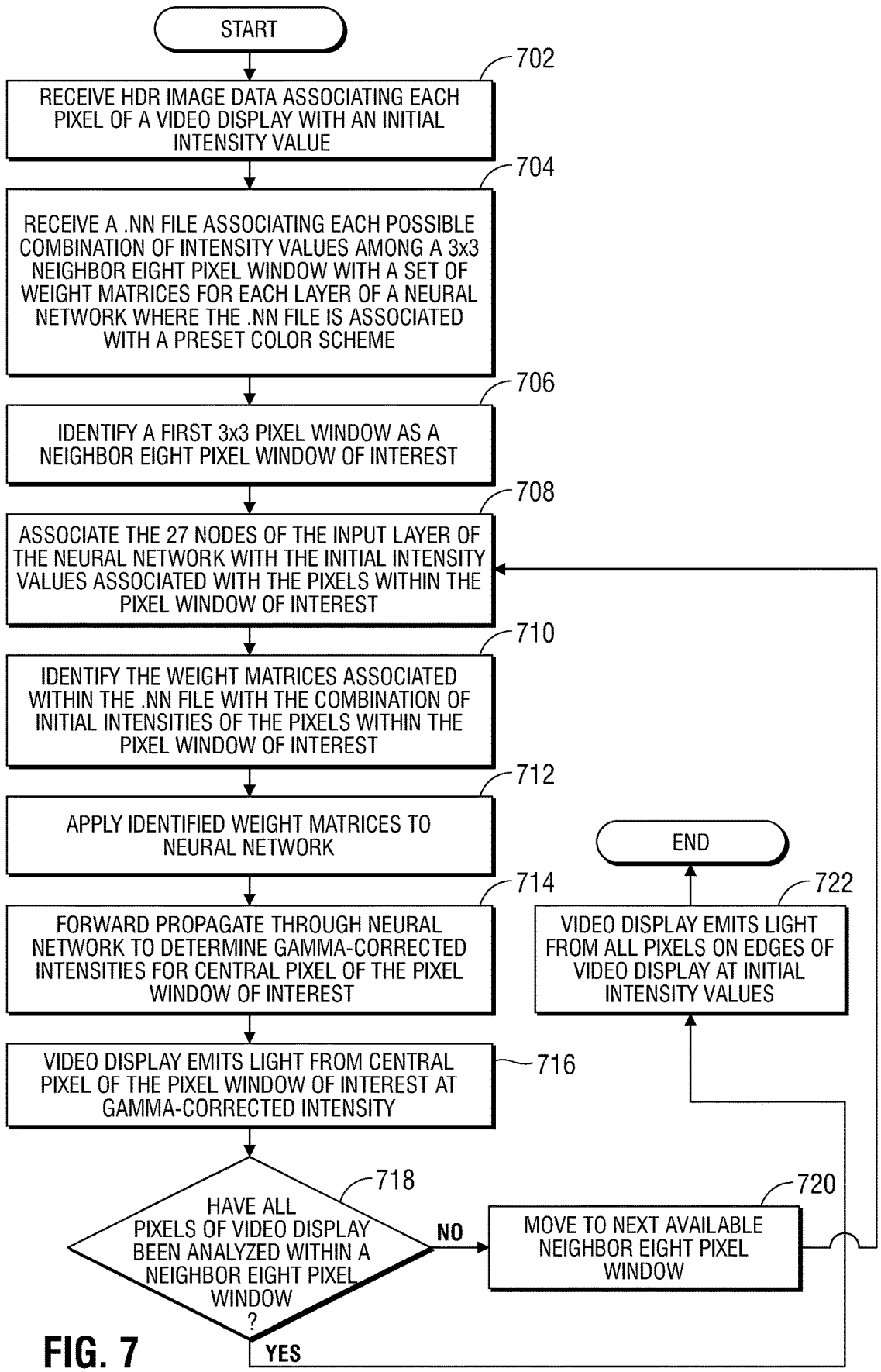
FIG. 7 is a flow diagram illustrating a method of applying an optimally gamma-corrected factor to a plurality of pixel intensity values according to an embodiment of the present disclosure.

FIG. 7 is a flow diagram illustrating a method of applying an optimally gamma-corrected factor to a plurality of pixel intensity values during a working phase according to an embodiment of the present disclosure. The determination and application of optimal gamma-correction values to intensity values of a plurality of pixels of a video display in an embodiment may be broken down into two phases: (1) a learning phase; and (2) a working phase. During a learning phase, a learning dynamic gamma-correction optimization system in an embodiment may model a neural network for determining optimally gamma-corrected intensity values for one or more pixels in a predefined pixel window, and may determine optimal weight matrices for that neural network, based on the array of intensity values input into the network. The learning dynamic gamma-correction optimization system in an embodiment may receive intensity values for a plurality of pixels in HDR image data during a working phase, and may input those intensity values into a neural network having the same architecture as the neural network modeled during the learning phase. By applying the optimal weight matrices determined during the learning phase to the neural network during the working phase, the neural network may then output intensity values for one or more pixels that have been optimally gamma-corrected. FIG. 7 depicts a method of the working phase in an embodiment. The learning phase is discussed in greater detail below with reference to FIG. 8.

At block 702, the learning dynamic gamma-correction optimization system in an embodiment may receive HDR image data associating each pixel or sub-pixel of a video display with an initial intensity value. The portion of the learning dynamic gamma-correction optimization system executing block 702, as well as the other blocks of the working phase may reside upon an end user information handling system including a video display. The portion of the learning dynamic gamma-correction optimization system executing the learning phase may also reside on an end user information handling system in an embodiment, and may reside in other embodiments in an information handling system located remotely from the video display.

This initial intensity value in an embodiment may be non-gamma-corrected. In other words, it may not be tailored for optimal viewing via the specific video display of an end user information handling system. In order to display the HDR image described by the HDR image data, the processor or graphics processor of an information handling system may associate an intensity found in the HDR image data with a voltage to apply to a pixel or sub-pixel of the video display in order to cause that pixel or sub-pixel to emit light at the intensity found in the HDR image data. Assuming a linear relationship between the intensity of a pixel or sub-pixel and the voltage applied to that pixel or sub-pixel may result in distortion of the image as it is displayed, because the relationship between the voltage applied to a pixel or sub-pixel and the intensity actually emitted by the pixel or sub-pixel is non-linear. Existing systems often perform a gamma-correction method when assigning a voltage to each sub-pixel based on the illumination given in the HDR digital image data in order to account for this potential distortion by applying a single, static gamma correction factor (r), determined at the time of manufacture of the video display, to all pixels of the video display. These existing methods limit the ability to optimize the display of HDR digital images, because they do not allow for different pixels of the video display, or even different regions of the video display to be associated with different gamma-correction factors. The learning dynamic gamma-correction optimization system in an embodiment may address these issues by dynamically identifying an optimal gamma-correction factor for each pixel in a video display.

The learning dynamic gamma-correction optimization system in an embodiment may receive a .nn file associating each possible combination of intensity values among a 3×3 neighbor-eight pixel window with a set of weight matrices for each layer of a neural network in an embodiment at block 704. For example, in an embodiment described with reference to FIG. 4, the learning dynamic gamma-correction optimization system may receive a .nn file associating each possible combination of input values (e.g. $X_1$, $X_2$, and $X_3$ at the first input node 410, the second input node 412, and the third input node 414, respectively) with a set of weight matrices including weights $w_{1,1}$ 434-$w_{3,9}$ 486. The values of the weights $w_{1,1}$ 434-$w_{3,9}$ 486 may reflect the optimal weights determined according to a gradient descent method that will result in optimal output values $Y_1'$, $Y_2'$, and $Y_3'$ at the first output node 428, the second output node 430, and the third output node 432, respectively. Further, the .nn file received in an embodiment may be associated with a preset color scheme, as described in greater detail below with reference to FIG. 8.

At block 706, the learning dynamic gamma-correction optimization system in an embodiment may identify a first 3×3 neighbor-eight pixel window of interest within the pixels of the video display. For example, in an embodiment described with reference to FIG. 3, a first pixel window 302 may be located in the upper left-hand corner of the video display 110. The first pixel window 302 may be an m×n grid of pixels where m represents the number of pixels included across the x-axis and n represents the number of pixels included across the y-axis. For example, in an embodiment shown in FIG. 3, the first pixel window 302 may include a 3×3 grid of pixels such that m=3 and n=3. The 3×3 neighbor-eight pixel window of interest identified at block 706 in such an embodiment may include a central pixel P0, surrounded in a clockwise manner with eight pixels, identified as P1-P8. In other embodiments, m and n may be any odd number (e.g. 5 or 7). In other aspects of an embodiment, the pixel window identified at block 706 may include any nine neighboring pixels located anywhere within the video display 110.

Returning to FIG. 7, the learning dynamic gamma-correction optimization system in an embodiment may associate the 27 nodes of the input layer of the neural network with the initial intensity values associated with the pixels within the pixel window of interest at block 708. Each pixel within the 3×3 neighbor-eight pixel window of interest may include three sub-pixels (e.g. red (R), green (G), and blue (B)), and each of these sub-pixels may be associated with an intensity value in the HDR image data received at block 702. Thus, there may be 27 different intensity values associated with all of the sub-pixels of all of the pixels within the 3×3 neighbor-eight pixel window of interest in the HDR image data.

At block 708, the learning dynamic gamma-correction optimization system in an embodiment may retrieve the intensity values associated with each of those sub-pixels of the 3×3 neighbor-eight pixel window of interest from the HDR image data, and use these values to generate values to associate with each input node of a neural network. For example, the intensity values associated with the pixels of the video display in the HDR image may range from zero to 255 in an embodiment. In such an example, the learning dynamic gamma-correction optimization system in an embodiment described with reference to FIG. 6 may assign the first input node 604 the intensity value associated with the red sub-pixel of the central pixel (P0(R)), the second input node 606 the intensity value associated with the green sub-pixel of the central pixel (P0(G)), and the third input node 608 the intensity value associated with the blue sub-pixel of the central pixel (P0(B)). In another example, the learning dynamic gamma-correction optimization system in such an embodiment may assign the 25th node 610 the intensity value associated with the red sub-pixel of the eighth pixel (P8(R)), the 26th node 612 the intensity value associated with the green sub-pixel of the central pixel (P8(G)), and the 27th node 612 the intensity value associated with the blue sub-pixel of the central pixel (P8(B)). In each of these examples, the intensity value associated with the input nodes of the neural network 600 may range from zero to 255. In other embodiments in which the intensity values associated with the pixels in the HDR image range from zero to another number (e.g. 1,023 or 4,095), the values associated with the input nodes of the neural network 600 may also range from zero to such other number.

In another embodiment described with reference to FIG. 6, the values associated with the input nodes of the neural network 600 may be a percentage of the total possible intensity values. The learning dynamic gamma-correction optimization system in an embodiment may associate each input node of the neural network 600 with a value from zero to one, representing a percentage of the highest possible intensity value. For example, in an embodiment in which the intensity values associated with pixels of the video display in the HDR image data range from zero to 255, the learning dynamic gamma-correction optimization system may associate each input node of the neural network 600 with a value from zero to one, where each value from zero to one represents a percentage of 255. As another example, in an embodiment in which the intensity values associated with pixels of the video display in the HDR image data range from zero to 1,023, the learning dynamic gamma-correction optimization system may associate each input node of the neural network 600 with a value from zero to one, where each value from zero to one represents a percentage of 1,023.

The learning dynamic gamma-correction optimization system in an embodiment may identify the weight matrices associated within the .nn file with the combination of initial intensities of the pixels within the pixel window of interest at block 710. During the learning phase, the learning dynamic gamma-correction optimization system in an embodiment may determine optimal weight matrices for optimally gamma-correcting pixels within a given pixel window for each possible combination of intensities associated with pixels in a hypothetical pixel window. For example, the learning dynamic gamma-correction optimization system in an embodiment in which the input node values range from zero to 255 may determine optimal weight matrices for a pixel window including eight pixels associated with an intensity value of zero, and one pixel associated with an intensity value of one. The learning dynamic gamma-correction optimization system in such an embodiment may then determine the optimal weight matrices for that pixel window including eight pixels associated with an intensity value of zero, and one pixel associated with an intensity value of two. The learning dynamic gamma-correction optimization system may perform this same analysis for every possible combination in turn, increasing the intensity associated with a single pixel by an increment of one, until it analyzes a pixel window including eight pixels associated with an intensity value of 255, and one pixel associated with an intensity value of 254. In such a way, the learning dynamic gamma-correction optimization system may store optimal weight matrices associated with each possible combination of input node values (e.g. values representing the intensity values associated with each pixel in an identified pixel window within the HDR image data) the neural network may receive during the working phase.

Thus, the .nn file received by the learning dynamic gamma-correction optimization system at block 704 in an embodiment may include one combination of weight matrices for each possible combination of intensity values that could be used as input values to a neural network having the same architecture as the neural network employed during the learning phase. At block 710, the learning dynamic gamma-correction optimization system may identify the specific combination of weight matrices associated within the .nn file with the combination of intensity values associated with the 27 input nodes of the neural network at block 708. This identified combination of weight matrices may represent the weighting values that, when applied to each of the nodes of the neural network receiving the input values associated with the 27 input nodes will generate output node values representing the optimally gamma-corrected intensity values for the pixels within the pixel window identified at 706.

At block 712, the learning dynamic gamma-correction optimization system in an embodiment may apply the identified weight matrices to the neural network. For example, the learning dynamic gamma-correction optimization system in an embodiment described with reference to FIG. 6 may apply the identified weight matrices to the neural network 600. These applied weight matrices may define the relationships of the activation values for nodes in the hidden layers 624 to the activation values for nodes in the immediately following hidden layer, or to the output values for output nodes in the output layer 626.

The learning dynamic gamma-correction optimization system may forward propagate the input values associated with the 27 nodes of the input layer through the neural network in an embodiment at block 714. For example, in an embodiment described with reference to FIG. 6, the learning dynamic gamma-correction optimization system may forward propagate the input values associated with the first through $27^{th}$ input nodes 604-614 of the input layer 602 (as well as input nodes not shown in FIG. 6) through each of the hidden layers 624 according to the weighting values applied at block 712. Such forward propagation may generate optimally gamma-corrected values associated with each of the output nodes within the output layer 626. For example, the first output node 630 may be associated with the optimally gamma-corrected intensity associated with the red sub-pixel of the central pixel P0 for the pixel window identified at block 704. As another example, the second output node 632 may be associated with the optimally gamma-corrected intensity associated with the green (G) sub-pixel of the central pixel P0 for the pixel window, and the third output node 634 may be associated with the optimally gamma-corrected intensity associated with the blue (B) sub-pixel of the central pixel P0 for the pixel window. The intensity values associated with the central pixel (P0) in such an embodiment may be stored in an optimal HDR image data file that associates those intensity values with the position of the central pixel for that identified pixel window with respect to the video display.

At block 716, the learning dynamic gamma-correction optimization system in an embodiment may direct the video display to emit light from the central pixel of the pixel window of interest at the optimally gamma-corrected intensity. For example, in an embodiment described with reference to FIG. 3, the forward propagation process of block 714 may result in output nodes having values equivalent to the optimally gamma-corrected intensities associated with the red, green, and blue sub-pixels of the central pixel 304 of the first pixel window 302. In such an embodiment, the learning dynamic gamma-correction optimization system may direct the video display to emit light from the central pixel 304 of the first pixel window 302 at those optimally gamma-corrected intensities output by the forward propagation method. The instruction to emit light according to the optimally gamma-corrected intensities in an embodiment may take the form of generating corrected HDR image data where each pixel (or sub-pixel) of the video display 110 is associated with an optimally gamma-corrected intensity value determined at block 714, and instructing a graphics processing unit to display image data according to the corrected HDR image data.

It may be determined at block 718 whether all pixels of the video display have been analyzed via the forward propagation method of the working phase within a neighbor-eight pixel window. As described above, the forward propagation method applied to a neighbor-eight pixel window in an embodiment may generate an optimally gamma-corrected intensity value(s) for the central pixel (or its sub-pixels) of the neighbor-eight pixel window alone. Thus, in order to generate an optimally gamma-corrected intensity for each pixel within a video display, the method of blocks 708-716 may need to be performed such that each pixel window of interest includes a different central pixel, until each pixel within the video display has been included in at least one pixel window of interest. If all pixels of the video display have not been analyzed via the forward propagation method of the working phase within a neighbor-eight pixel window, the method may proceed to block 720. If all pixels of the video display have been analyzed via the forward propagation method of the working phase within a neighbor-eight pixel window, the method may proceed to block 722.

At block 720, in an embodiment in which all pixels of the video display have not been analyzed via the forward propagation method of the working phase within a neighbor-eight pixel window, the learning dynamic gamma-correction optimization system may move to the next available neighbor-eight pixel window. For example, in an embodiment described with reference to FIG. 3, the learning dynamic gamma-correction optimization system may have only analyzed the pixels within the first pixel window 302 via the forward propagation method of the working phase within a neighbor-eight pixel window. In such an embodiment, at block 720, the learning dynamic gamma-correction optimization system may define the second pixel window 306 as the new pixel window of interest. The second pixel window 306 in an embodiment may be directly adjacent to the first pixel window 302, and may overlap the first pixel window 302 such that the central pixel 308 of the second pixel window 306 is the pixel located directly to the right of the central pixel 304 of the first pixel window 302.

The method may then proceed back to block 708 to associate the 27 input nodes of the neural network with the intensity values associated with the pixels within the second pixel window 306 within the HDR image data received at block 702. The learning dynamic gamma-correction optimization system may repeat the method of blocks 708-716 for each newly defined neighbor-eight pixel window until an optimally gamma-corrected intensity value(s) for each non-border pixel (or sub-pixel) of the video display is determined through forward propagation during the working phase.

At block 722, the learning dynamic gamma-correction optimization system in an embodiment may direct the video display to emit light from all pixels on the edges of the video display at initial intensity values. As described herein, the forward propagation method of the working phase in an embodiment may instruct the video display to emit light of the central pixel of a neighbor-eight pixel window at an optimally gamma-corrected intensity. Because the central pixel of a neighbor-eight pixel window has at least one pixel located directly above it in such an embodiment, below it, to the right of it, and to the left of it, a central pixel of a neighbor-eight pixel window may never be located on an edge or border of the video display. For example, in an example embodiment described with reference to FIG. 3, the first pixel window 302 may be located on the top and left-side borders or edges of the video display 110. Thus, the first, second, third, seventh, and eighth pixels of the first pixel window 302 may be located on the borders or edges of the video display 110.

The learning dynamic gamma-correction optimization system in such an embodiment may not be capable of identifying a neighbor-eight pixel window that places any of these first, second, third, seventh, and eighth pixels of the first pixel window 302 in the center of a neighbor-eight pixel window as a central pixel. As a consequence, the learning dynamic gamma-correction optimization system in an embodiment may forego determination of optimally gamma-corrected intensity values for these border pixels, and may automatically apply a gamma-correction factor equivalent to one. The effect of such an application in an embodiment results in a non-gamma-corrected intensity value associated with each of these pixels. Thus, the video display 110 may be instructed to emit light via these pixels according to the intensity values with which they are associated in the original HDR image data received at block 702.

The method of FIG. 7 may also be performed using pixel windows having different dimensions than the neighbor-eight pixel window (e.g. 3×3 pixel window). For example, pixel windows having width and height dimensions equivalent to any positive, odd number greater than one may be used (e.g. 5×5, or 7×7). Further, some of the steps of FIG. 7 may occur simultaneously. For example, blocks 716 and 722 may occur simultaneously such that the video display simultaneously emits optimally gamma-corrected intensities via the non-border pixels and emits non-gamma-corrected intensities via the border pixels.

Figure 8:
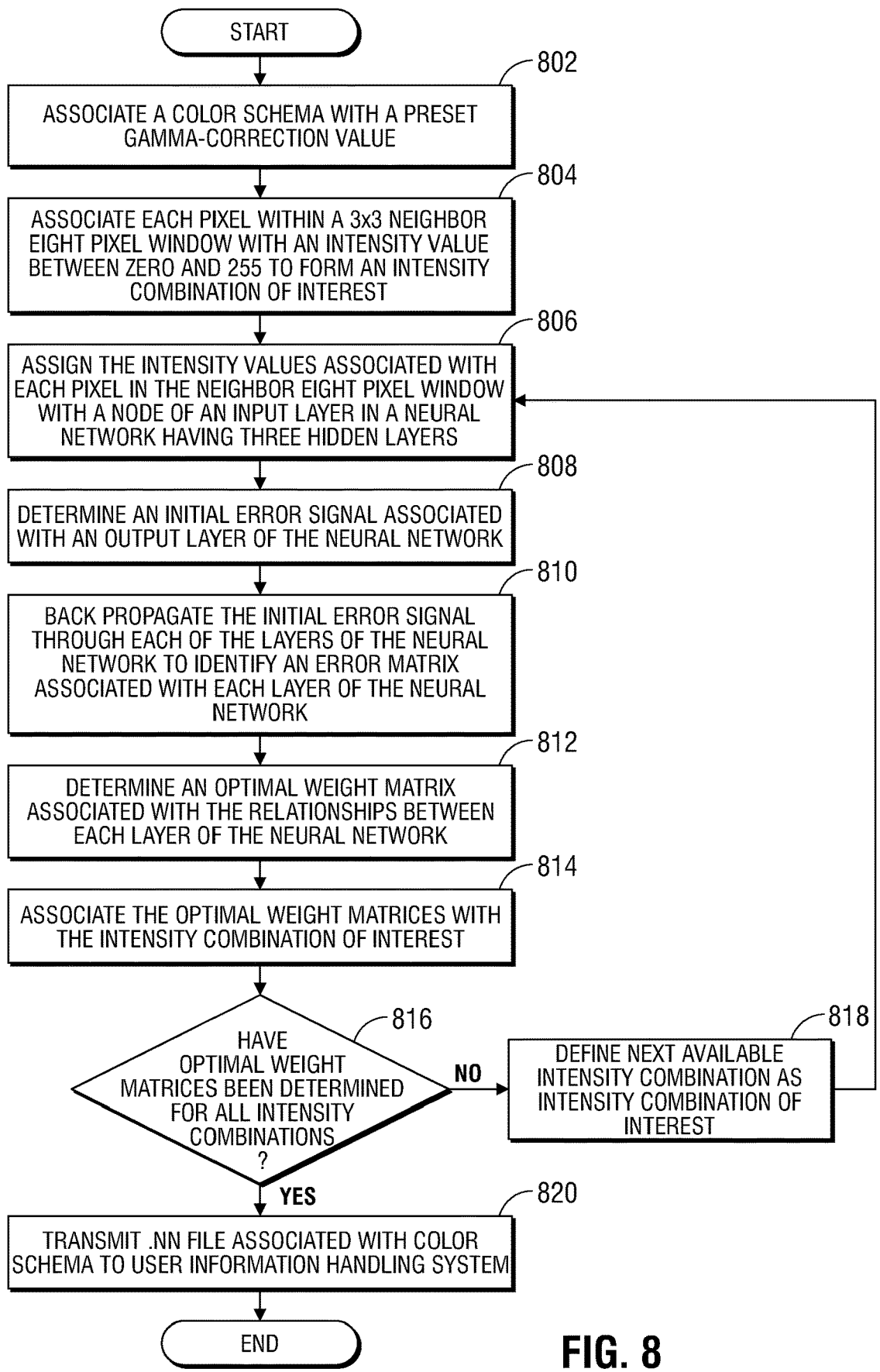
FIG. 8 is a flow diagram illustrating a method for determining optimal weight matrices associated with a defined color scheme according to an embodiment of the present disclosure.

FIG. 8 is a flow diagram illustrating a method for determining optimal weight matrices associated with a defined color scheme during a learning phase according to an embodiment of the present disclosure. As described herein, the determination and application of optimal gamma-correction values to intensity values of a plurality of pixels of a video display in an embodiment may be broken down into a learning phase and a working phase. The working phase is described in greater detail with respect to FIG. 7. During a learning phase, a learning dynamic gamma-correction optimization system in an embodiment may model a neural network for determining optimally gamma-corrected intensity values for one or more pixels in a predefined pixel window, and may determine optimal weight matrices for that neural network, based on the array of intensity values input into the network. FIG. 8 depicts a method of the learning phase in an embodiment.

A user in an embodiment may select from a plurality of available color schemes, including, for example, a high-contrast color scheme, a high-saturation color scheme, or a high-brightness color scheme. A high-contrast color scheme in an embodiment may be a color scheme associated with a gamma-correction factor known to maximize the gradient energy across a given pixel window. The high-contrast color scheme may be determined, for example, by identifying the optimal gamma-correction factor known to maximize the gradient energy across a pixel window, and applying that optimal gamma-correction factor to output optimally gamma-corrected R, G, and B intensity values for each of the pixels in the pixel window, as described above with respect to FIGS. 2-3. A high brightness color scheme in an embodiment may be a color scheme in which the red, green, and/or blue intensity values associated with the sub-pixels of a given pixel are all increased from their initial values in either a linear fashion, or by increasing the gamma-correction value for every pixel in a video display. A high-saturation color scheme in an embodiment may be a color scheme in which the red, green, and/or blue intensity values associated with the sub-pixels of a given pixel are altered to maximize the saturation between the red, green, and blue intensity values of that sub-pixel.

At block 802, the learning dynamic gamma-correction optimization system in an embodiment may associate a color scheme with a preset gradient energy value, a preset gamma-correction factor, or a preset saturation value between the sub-pixels of a given pixel. In other embodiments, users may be able to choose a high-contrast color scheme. The high-contrast color scheme in an embodiment may be associated with a preset gradient energy value equivalent to the maximum gradient energy value. Further, the preset gradient energy value in an embodiment may then be associated with a positive gamma-correction factor whose application to an intensity value for the central pixel of the pixel window across which the gradient energy is taken would result in a maximum gradient energy. For example, in an embodiment described with reference to FIG. 2, the learning dynamic gamma-correction optimization system in an embodiment may associate the high-contrast color scheme with a preset gradient energy value equivalent to the maximum gradient energy 204 of 180916. The learning dynamic gamma-correction optimization system in an embodiment may then associate the high-contrast color scheme with the gamma-correction factor 206 having a value of 1.1. Application in such an embodiment of the gamma-correction value 1.1 using equation (3) to the red sub-pixel of the central pixel of the pixel window analyzed in FIG. 2 may result in an red sub-pixel intensity value (R') gamma-corrected according to the high-contrast color scheme.

In another embodiment, a color scheme identified as high-brightness may be associated with a preset gradient energy value equivalent to 95% of the maximum gradient energy value. Further, the preset gradient energy value in an embodiment may then be associated with a positive gamma-correction factor whose application to an intensity value for the central pixel of the pixel window across which the gradient energy is taken would result in a gradient energy of 95%. For example, in an embodiment described with reference to FIG. 2, the learning dynamic gamma-correction optimization system in an embodiment may associate the high-brightness color scheme with a preset gradient energy value of 171367, which equates to roughly 95% of the maximum gradient energy 204 of 180916. The learning dynamic gamma-correction optimization system in an embodiment may then associate the high-brightness color scheme with the gamma-correction factor of 1.2. Application in such an embodiment of the gamma-correction value 1.2 using equation (3) to the red sub-pixel of the central pixel of the pixel window analyzed in FIG. 2 may result in a red sub-pixel intensity value (R') gamma-corrected according to the high-brightness color scheme.

In other embodiments, other color schema may be associated with other percentage values of the maximum gradient energy across a pixel window. For example, some a "low-fidelity" or "washed out" color scheme may be associated with a gradient energy below 50% of the maximum gradient energy. In still other embodiments, one preset gradient energy value may be associated with intensity values for sub-pixels of one of the three colors, while a second preset gradient energy value may be associated with intensity values for the other sub-pixels. For example, a preset gradient energy value equivalent to the maximum gradient energy may be associated with only green sub-pixels while a preset gradient energy value equivalent to only 90% of the maximum gradient energy may be associated with red and blue sub-pixels.

At block 804, the learning dynamic gamma-correction optimization system in an embodiment may associate each pixel within a 3×3 pixel window with an intensity value between zero and 255 to form an intensity combination of interest. The maximum gradient energy measured across such a 3×3 pixel window in an embodiment may be a function of the intensity values associated with each of the pixels in the window. During a learning phase, the learning dynamic gamma-correction optimization system in an embodiment may model a neural network capable of optimizing a gamma-correction factor based on the preset gradient energy percentage, then determine optimal weight matrices associated with each node of each layer of the network. The learning phase in such an embodiment may entail performing this analysis for every possible combination of intensity values the pixels within the 3×3 pixel window may be capable of generating. For example, the learning dynamic gamma-correction optimization system in an embodiment may perform this analysis to determine optimal weight matrices for a neural network with three hidden layers for an initial scenario in which eight of the pixels in the 3×3 pixel window have an intensity value of zero and one of the pixels in the 3×3 pixel window has an intensity value of one. The learning dynamic gamma-correction optimization system may then perform this same analysis on every possible combination of intensities up to a 3×3 pixel window where one of the pixels in the 3×3 pixel window has an intensity value of 254 and the other eight pixels in the 3×3 pixel window have an intensity value of 255.

The end result of such a process may include a .nn file for each possible combination of intensity values. The .nn file in such an embodiment may include optimal weight matrices that may be applied, during a working phase, to a neural network with the same architecture as the neural network employed during the learning phase. During the working phase, the information handling system upon which the learning dynamic gamma-correction optimization system resides, or on an information handling system remote from the learning dynamic gamma-correction optimization system may receive an input of intensities equivalent to the combination of intensity values with which the .nn file is associated. The information handling system executing the working phase may use the weight matrices within such a .nn file in order to output optimally gamma-corrected intensity values resulting in a gradient energy across the 3×3 pixel window that is equivalent to the preset gradient energy percentage.

At block 806, the learning dynamic gamma-correction optimization system in an embodiment may assign the intensity values associated with each pixel in the neighbor-eight pixel window with a node of an input layer in a neural network having three hidden layers. Each layer of the neural network in such an embodiment may include 27 nodes, such that each of the layers are fully connected. For example, in an embodiment described with reference to FIG. 6, the learning dynamic gamma-corrected optimization system may assign the intensity values associated with each pixel in the neighbor-eight pixel window with an input node of the input layer 602 within the neural network 600. The neural network 600 in such an embodiment may include an input layer 602, three hidden layers 624, and an output layer 626, which may each include 27 nodes, and may be fully connected to immediately adjacent layers. In such an embodiment, the learning dynamic gamma-correction optimization system may associate each of the 27 nodes of the input layer 602 (including nodes 604-618 and nodes not shown in FIG. 6 representing values associated with pixels P1-P7 within the pixel window) with the intensity value with which one of the sub-pixels within the pixel window is associated at block 804.

In other embodiments in which a pixel window has dimensions other than 3×3 (e.g. 5×5, or 7×7), each layer of the neural network may include a total number of nodes that is equivalent to the number of sub-pixels within the pixel window (e.g. 75, or 147). In such embodiments, the number of hidden layers may also be equivalent to the width of the pixel window. For example, in an embodiment in which a 5×5 pixel window is used, the neural network may include five hidden layers. As another example, in an embodiment in which a 7×7 pixel window is used, the neural network may include seven hidden layers. In still other embodiments, the number of hidden layers may remain fixed at three, regardless of the size of the pixel window.

The learning dynamic gamma-correction optimization system in an embodiment may forward propagate the values associated with the input nodes through the neural network to determine an error signal associated with each output node at block 808. For example, in an embodiment described with reference to FIG. 6, the learning dynamic gamma-correction optimization system may forward propagate the values associated with the input nodes (including nodes 604-614 and nodes not shown in FIG. 6 representing values associated with pixels P1-P7 within the pixel window) through the neural network 600. Such a forward propagation method may be described in greater detail with reference to FIG. 9, and may involve initially setting each weighting value within the neural network to a value of one or some other preset value.

The forward propagation process of such an embodiment may produce the output nodes (including nodes 630-640 and nodes not shown in FIG. 6 representing initially gamma-corrected intensity values associated with pixels P1-P7 within the pixel window) within the output layer 626. As also described in greater detail with reference to FIG. 9, the learning dynamic gamma-correction optimization system in an embodiment may determine an error signal associated with each output node by taking the difference between the values of the output nodes generated through the forward propagation method of the learning phase and optimally gamma-corrected intensity values associated with the same pixels, as identified by a maximum gradient energy analysis.

At block 810, the learning dynamic gamma-correction optimization system in an embodiment may back propagate the error signals associated with each node of the output layer through each of the non-input layers of the neural network to determine an error vector associated with each layer of the neural network. As described herein, the error signal at a given node in an embodiment may be a function of the error signals associated with each node providing input into that node, and the weighting values describing the relationship between the given node and each of the nodes providing input into that node. The weighting values employed during the forward propagation method of block 808 and the back propagation method of block 810 may be preset in an embodiment to a value of one, and the error signals of each of the output nodes (e.g. 27 output nodes) may have been determined at block 808. In such an embodiment, 27 different equations may be used to determine the error signals for the 27 nodes of the hidden layer immediately preceding the output layer, giving 27 equations and 27 unknowns (e.g. the error signals associated with each of the nodes in the layer immediately preceding the output layer). Thus, these 27 equations could be solved in combination to determine the 27 unknown variables describing the error signal associated with each of the nodes in the layer immediately preceding the output layer. As described in further detail with reference to FIG. 10, this process may be repeated for each non-input layer until a vector including an error signal value for each node in a layer is determined for each non-input layer in the neural network.

The learning dynamic gamma-correction optimization system in an embodiment may determine an optimal weight matrix associated with the relationships between each node of each layer of the neural network at block 812. The method of iteratively identifying an optimal weight matrix in an embodiment may be described in greater detail with reference to FIG. 11. The result of such a method may include a weight matrix for each non-input layer of the neural network. Each weight matrix may describe the weighting value to assign to each combination of the nodes of a given layer and the nodes of a previous layer. The optimal weight matrices determined at block 812 may operate to output optimally gamma-corrected intensity values for each of the pixels in the pixel window when they are applied to a neural network receiving the same input layer values assigned at block 806 and having the same architecture as the neural network used for the forward propagation method of block 808 and the back propagation method of block 810.

At block 814, the learning dynamic gamma-correction optimization system in an embodiment may associate the optimal weight matrices with the intensity combination of interest and the color scheme identified at block 802. For example, the learning dynamic gamma-correction optimization system in an embodiment may perform the method of blocks 806-812 to determine optimal weight matrices for a pixel window, eight of whose pixels were associated at block 804 with an intensity value of zero, and one of whose pixels was associated with an intensity value of one. In such an embodiment, at block 814, the learning dynamic gamma-correction optimization system may associate the optimal weight matrices determined at block 812 with the combination of intensity values with which each of these pixels were associated at block 804 for the color scheme identified at block 802.

The learning dynamic gamma-correction optimization system in an embodiment may determine, at block 816, whether optimal weight matrices have been determined for all possible combinations of intensity values for the given color scheme. As described herein, the learning phase described with reference to FIG. 8 may operate to identify optimal weight matrices for every possible combinations of intensity values in pixel windows of a given size for a given color scheme. For example, in an embodiment in which a pixel window measures 3×3, and each pixel in the 3×3 pixel window may have a value between zero and 255, the learning dynamic gamma-correction optimization system may analyze 1.13 quintillion ($1.13 \times 10^{16}$) possible combinations of intensity values. As another example, in an embodiment in which a pixel window measures 3×3, and each pixel in the 3×3 pixel window may have a value between zero and one in increments of 0.1, the learning dynamic gamma-correction optimization system may analyze 210 trillion ($2.1 \times 10^{12}$) possible combinations of intensity values. In still other embodiments, the number of combinations analyzed may be decreased from these values by taking into account the fact that combinations that are mirror images of one another will have the same result. If the learning dynamic gamma-correction optimization determines that optimal weight matrices have not been determined for all possible intensity combinations, the method may proceed to block 818. If the learning dynamic gamma-correction optimization determines that optimal weight matrices have been determined for all possible intensity combinations, the method may proceed to block 820.

At block 818, if the learning dynamic gamma-correction optimization system has determined optimal weight matrices have not been determined for all intensity combinations, the learning dynamic gamma-correction optimization system may define the next available intensity combination as the intensity combination of interest. For example, in an embodiment in which the learning dynamic gamma-correction optimization system performed the method of blocks 806-812 to determine optimal weight matrices for a pixel window, eight of whose pixels were associated at block 804 with an intensity value of zero, and one of whose pixels was associated with an intensity value of one, the learning dynamic gamma-correction optimization system at block 818 may then define the next available intensity combination as eight pixels having an intensity value of zero and one pixel having an intensity value of two. The method may then proceed back to block 806 for determination of an optimal weight matrix for this intensity combination. The learning dynamic gamma-correction optimization system may then perform this same analysis of blocks 806-814 on every possible combination of intensities up to a 3×3 pixel window where one of the pixels in the 3×3 pixel window has an intensity value of 254 and the other eight pixels in the 3×3 pixel window have an intensity value of 255.

At block 820, in an embodiment in which optimal weight matrices have been determined for all intensity combinations, the learning dynamic gamma-correction optimization system may transmit a .nn file associated with the given color scheme to a user information handling system. As described herein, in some embodiments, a single learning dynamic gamma-correction optimization system residing solely within an end user information handling system where the video display is also located may perform both the learning phase and working phase. In such a situation, the .nn file generated at block 814 in an embodiment may not be transmitted according to block 820. In other embodiments, a portion of the learning dynamic gamma-correction optimization system that performs the learning phase may reside in an information handling system located remotely from the information handling system that includes the video display where a second portion of the learning dynamic gamma-correction optimization system performs the working phase. In such an embodiment, the learning phase of blocks 802-818 may be executed at a first information handling system located remotely from a second information handling system including the video display. A first portion of the learning dynamic gamma-correction optimization system operating within the first information handling system in such an embodiment may transmit the .nn file to the remotely located second information handling system for execution of the working phase by a second portion of the learning dynamic gamma-correction optimization system residing at the second information handling system. The method of the learning phase may then end.

Figure 9:
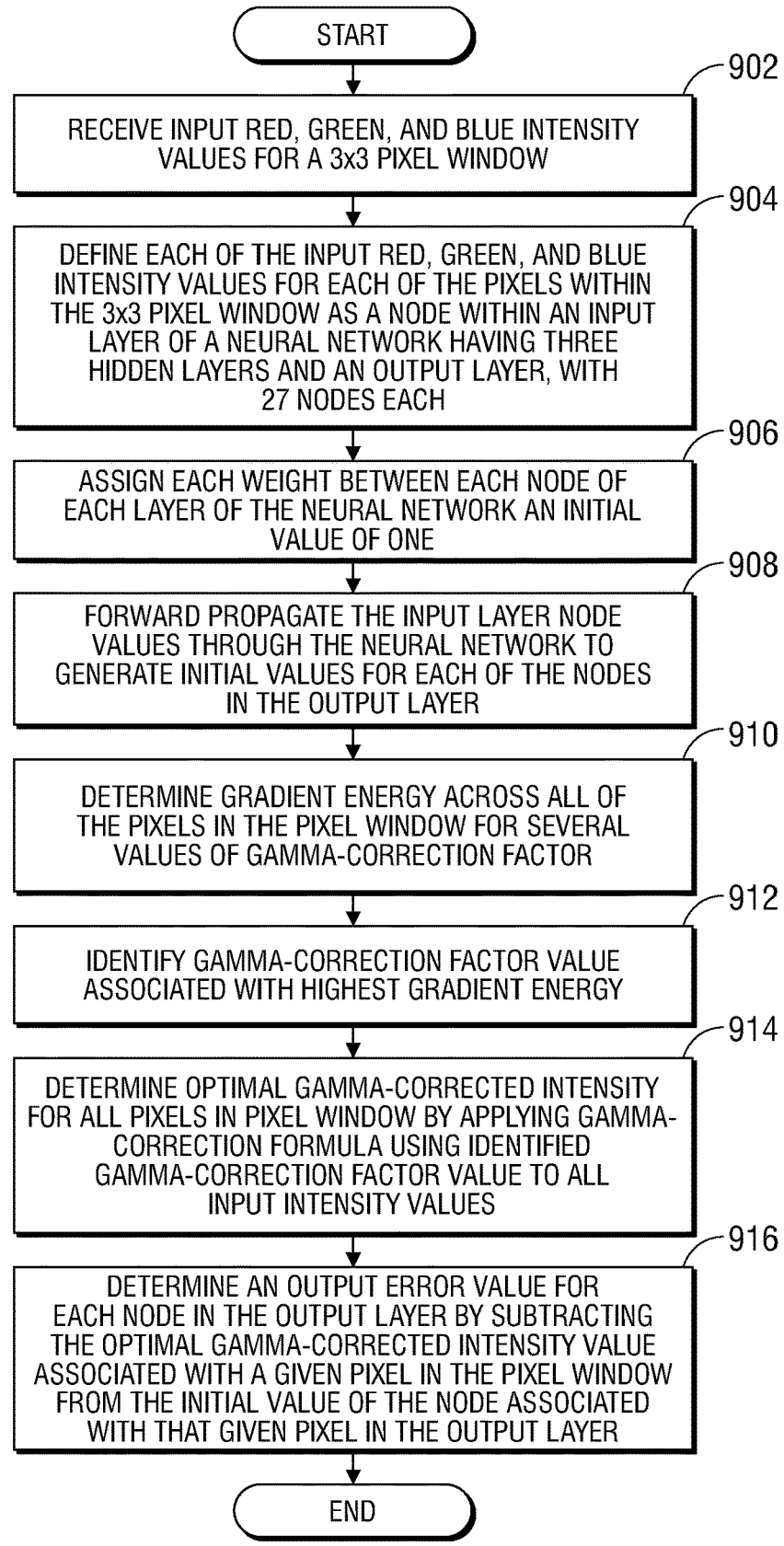
FIG. 9 is a flow diagram of a method of forward propagating through the layers of a neural network according to an embodiment of the present disclosure.

FIG. 9 is a flow diagram of a method of forward propagating through the layers of a neural network modeling determination of an optimal gamma-correction factor for each pixel in a video display according to an embodiment of the present disclosure. As described herein, the neural network in an embodiment may model the process of determining, for each pixel window into which the video display is partitioned, an optimal gamma-correction factor associated with a highest gradient energy magnitude measured across each of the pixels within the pixel window. This process, beginning with the input layer of the neural network, and propagating forward through each of the layers of the neural network to reach the output layer in an embodiment may be referred to as a forward propagation method.

At block 902 in an embodiment, the learning dynamic gamma-correction optimization system may receive input HDR image data associating each pixel within a defined pixel window with a red (R), green (G), and blue (B) intensity value. For example, in an embodiment described with reference to FIG. 3, the learning dynamic gamma-correction optimization system may receive input HDR image data associating an intensity value to each of the red sub-pixels, green sub-pixels, and blue sub-pixels for each of the nine pixels (e.g., P(0) 304, P(1), P(2), P(3), P(4), P(5), P(6), P(7), and P(8)) of the 3×3 first pixel window 302. As another example shown in the embodiment described with reference to FIG. 3, the learning dynamic gamma-correction optimization system may receive input HDR image data associating an intensity value to each of the red sub-pixels, green sub-pixels, and blue sub-pixels for each of the nine pixels (e.g., P(0) 308, P(1), P(2), P(3), P(4), P(5), P(6), P(7), and P(8)) of the 3×3 second pixel window 306. As yet another example, in an embodiment in which a pixel window measures 5×5, the learning dynamic gamma-correction optimization system may receive input HDR image data associating an intensity value to each of the red sub-pixels, green sub-pixels, and blue sub-pixels for each of the 25 pixels (e.g. P(0)-P(24)) of the 5×5 pixel window.

The learning dynamic gamma-correction optimization system in an embodiment may define each of the input red, green, and blue intensity values for each of the pixels within a m×n pixel window as a node within an input layer of a neural network at block 904. The neural network in some embodiments may have a number of hidden layers equivalent to the width (m) of the pixel window. For example, in an embodiment described with reference to FIG. 6, the learning dynamic gamma-correction optimization system may define each of the input red, green, and blue intensity values for each of the nine pixels within a 3×3 pixel window as the value of one of the nodes 604-614 (as well as the fourth through 24$^{th}$ nodes not shown) within the input layer 602 of the neural network 600. Further, the neural network 600 in such an embodiment may have three hidden layers 624, including a first layer 616, a second layer 618, and a third layer 620, where the number (e.g. three) of hidden layers 624 is equivalent to the width of the 3×3 pixel window.

At block 906, the learning dynamic gamma-correction optimization system in an embodiment may assign each weighting value between each node of each layer of the neural network an initial value of one. For example, in an embodiment described with reference to FIG. 4, the learning dynamic gamma-correction optimization system may assign each weighting value 434-486 an initial value of one. In other embodiments, any non-zero, positive value may be initially assigned to the weighting values between each of the nodes of the neural network. In still other embodiments, one or more weighting values may be initially assigned a first non-zero, positive value while other weighting values may be initially assigned a second non-zero, positive value. In still other embodiments, each of the weighting values may be initially assigned different non-zero, positive values.

The learning dynamic gamma-correction optimization system in an embodiment may forward propagate the input layer node values through the neural network at block 908 to generate initial values for each of the nodes in the output layer. For example, in an embodiment described with reference to FIG. 6, the learning dynamic gamma-correction optimization system in an embodiment may forward propagate the values associated with the input nodes 604-614 (as well as the input nodes not shown in FIG. 6 associated with the pixels P(1)-P(7) of the pixel window) through the hidden layers 624 in order to determine the initially gamma-corrected intensity values of nodes 630-640 (as well as the output nodes not shown in FIG. 6 associated with the pixels P(1)-P(7) of the pixel window).

At block 910, the learning dynamic gamma-correction optimization system in an embodiment may determine a plurality of gradient energies across all of the pixels in the pixel window of interest for several values of the gamma-correction factor. As described herein, the magnitude of the gradient energy between any two pixels of the neighbor eight pixel window may be found according to the following equation, where R ($P_i$), G ($P_i$), and B ($P_i$) are red, green, and blue intensity values associated with the red, green, and blue sub-pixels of a pixel identified within the neighbor eight pixel window as pixel $P_i$, R ($P_0$), G ($P_0$), and B ($P_0$) are red, green, and blue intensity values associated with the red, green, and blue sub-pixels of the central pixel within the neighbor eight pixel window, and where i has a value between one and eight, as described in greater detail with reference to FIG. 3:

$$G(P_i) = \sqrt{\{[R(P_0) - R(P_i)]^2 + [G(P_0) - G(P_i)]^2 + [B(P_0) - B(P_i)]^2\}} \quad (4)$$

The total gradient energy across a neighbor-eight pixel window would then be found according to the equation:

$$G(I) = \Sigma_{i=1}^{(m \times n)-1} G(P_i) \quad (5)$$

As described herein, most information handling systems apply a gamma-correction equation (3) to the received HDR digital image, such that the red, green, and blue sub-pixels within the pixel window display gamma-corrected intensities (R', G', and B') which are functions of original intensities (R, G, and B), the natural base number (e), and a gamma-correction factor (r).

At block 912, the learning dynamic gamma-correction optimization system in an embodiment may identify a gamma-correction factor value associated with a highest gradient energy magnitude value. The learning dynamic gamma-correction optimization system in an embodiment may determine the gradient energy across all pixels in an m×n grid for several values of the gamma-correction factor (r) in order to find an optimal gamma-correction factor associated with the highest resulting gradient energy. For example, the learning dynamic gamma-correction optimization system in an embodiment described with reference to FIG. 2 may identify a gradient energy G(I) for each value of the gamma-correction factor r and plot these values in the gradient energy vs. gamma correction factor chart 202. In such an embodiment, a peak gradient energy 204 can be seen within the gradient energy vs. gamma correction factor chart 202 as being associated with the optimal gamma correction factor (r) equivalent to the value 1.1. Based on this gradient energy vs. gamma correction factor chart 202, the learning dynamic gamma-correction optimization system in an embodiment may determine the optimal gamma-correction factor for the pixels within the m×n grid that should be applied to all of the pixels in the grid in order to generate the highest contrast between these pixels has a value of 1.1. If the gradient energy determination results in a value of zero, and this number does not change with the value of the gamma-correction factor (r), the learning dynamic gamma-correction optimization system in an embodiment may automatically assign a value of 1 to the gamma-correction factor (r).

At 914, the learning dynamic gamma-correction optimization system in an embodiment may apply the identified gamma-correction factor value to the intensity (R, G, B) values associated with each of the pixels within the pixel window in the original HDR image data. For example, in an embodiment described with reference to FIG. 3, if the pixel window of interest is the first pixel window 302, the learning dynamic gamma-correction optimization system may apply the identified optimal gamma-correction factor to the intensity values associated with the pixels in the first pixel window 302 in the original HDR image using equation 3.

The learning dynamic gamma-correction optimization system in an embodiment may determine an output error signal value for each node in the output layer at block 916 by subtracting the optimal gamma-corrected intensity value associated with a given pixel in the pixel window from the initial value of the node associated with that given pixel in the output layer. For example, in an embodiment described with reference to FIG. 3, the learning dynamic gamma-correction optimization system may have determined at block 914 an optimal gamma-corrected intensity value for each red, green, and blue sub-pixel for the nine pixels (e.g. P(0) 304, P(1), P(2), P(3), P(4), P(5), P(6), P(7), and P(8)) of the first pixel window 302. As another example, in an embodiment described with reference to FIG. 6, the learning dynamic gamma-correction optimization system may have determined at block 908 an initially gamma-corrected intensity value for the same sub-pixels, where each of those initially gamma-corrected intensity values is represented as an output value for one of the 27 nodes 630-640 of the output layer 626. As yet another example, in an embodiment described with reference to FIG. 5, the error signal $\delta_7$ 514 associated with the first output node 428 of the output layer 408 may be equivalent to the difference between the initial output value $Y_1$ and the optimal output value $Y_1'$.

Returning to FIG. 6, the first node 630 of the output layer 626 may have a value representing an initially gamma-corrected intensity value R' associated with the red sub-pixel for the central pixel 304 of the first pixel window 302. The learning dynamic gamma-correction optimization system in an embodiment may compare this initially gamma-corrected intensity value R' to the optimally gamma-corrected intensity for that sub-pixel (as determined at block 914) to determine a value for the error signal associated with the first node 630 of the output layer 626. This same approach may be repeated in order to find the value of the error signal associated with each of the nodes 632-640 (plus nodes not shown in FIG. 6 associated with pixels P(1)-P(7)) within the output layer 626. The method of FIG. 9 may then end.

Figure 10:
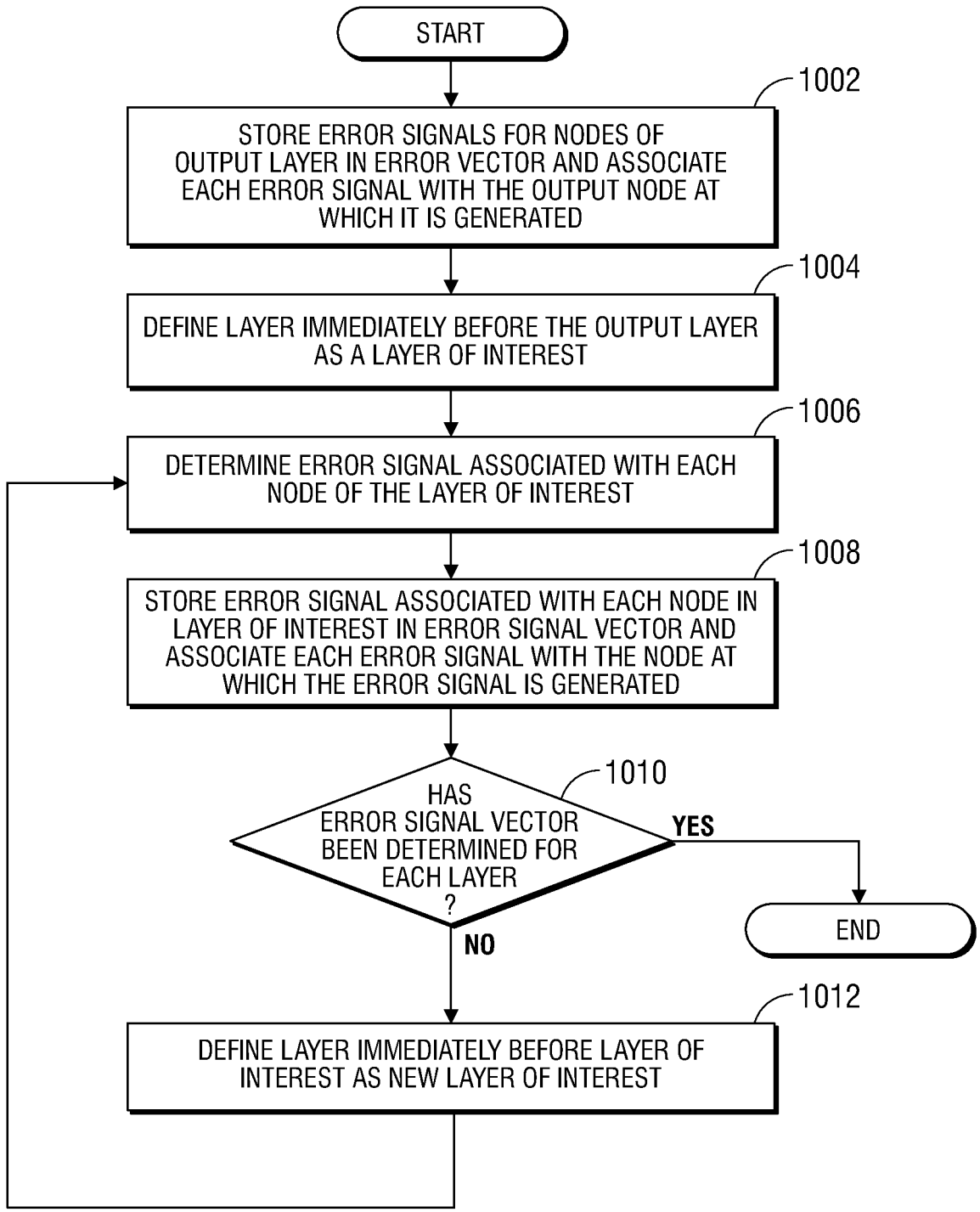
FIG. 10 is a flow diagram of a method of back propagation through the layers of a neural network according to an embodiment of the present disclosure.

FIG. 10 is a flow diagram of a method of back propagation through the layers of a neural network modeling a method for optimizing gamma-correction of all pixels within a display according to an embodiment of the present disclosure. As described herein, when forward propagating through the layers of a neural network, errors made at early layers of the neural network may propagate through to later layers. This is the case because of the interdependence between the output of a layer and the input of the next layer. The learning dynamic gamma-correction optimization system in an embodiment may operate to minimize such errors. In order to minimize such errors, they must first be isolated, and the effect of each error on each layer determined using a back propagation method.

A back propagation method in an embodiment may identify an error made in determination of the output layer of the neural network, which may be the result of errors made at any one of the layers of the neural network. The learning dynamic gamma-correction optimization system in an embodiment may use a back propagation method to determine the errors (error signals) made at each layer of the neural network. The outcome of such a process may include generation of an error signal vector for each layer of the neural network. Once the error signals are known for each node of each layer of the neural network, the learning dynamic gamma-correction optimization system may minimize these errors using a cost function minimizing approach.

The learning dynamic gamma-correction optimization system may begin the back propagation method in an embodiment at block 1002 by storing error signals for nodes of the output layer in the error vector and associating each error signal in that vector with the output node at which it is generated. As described herein, the learning dynamic gamma-correction optimization system in an embodiment may determine an output error signal value for each node in the output layer by subtracting the optimal gamma-corrected intensity value associated with a given pixel in the pixel window from the initial value of the node associated with that given pixel in the output layer. For example, the learning dynamic gamma-correction optimization system in an embodiment described with reference to FIG. 9 may compare an initially gamma-corrected intensity value generated at an output node in the output layer through forward propagation of the neural network at block 916 using initial values of one for each of the weighting values to the optimally gamma-corrected intensity for the sub-pixel associated with the same output node to determine a value for the error signal associated with that output node. This same approach may be repeated in order to find the value of the error signal associated with each of the nodes within the output layer. Once each of these error signals are known for each of the output nodes in the output layer in an embodiment, the learning dynamic gamma-correction optimization system may store those error signals in a vector that associates each error signal with the output node at which that error signal is generated.

At block 1004, the learning dynamic gamma-correction optimization system in an embodiment may define a layer immediately preceding the output layer as a layer of interest. For example, in an embodiment described with reference to FIG. 5, the second layer 406 may be defined as the layer of interest. Once the error signals for each of the output nodes in the output layer, and the weighting values between each of the nodes in the output layer and each of the nodes in the layer immediately before the output layer are known, the error signals associated with each of the nodes in the layer immediately before the output layer may be determined. For example, once the error signals $\delta_7$ 514 associated with first output node 428, $\delta_8$ 516 associated with second output node 430, and $\delta_9$ 518 associated with the third output node 432, as well as the weights $w_{3,1}$ 470-$w_{3,9}$ 486 are known, the error signals $\delta_4$ 508 associated with first node 422 of the second layer 406, $\delta_5$ 510 associated with the second node 424 of the second layer 406, and $\delta_6$ 512 associated with the third node 426 of the second layer 406 may be determined.

The learning dynamic gamma-correction optimization system in an embodiment may determine an error signal associated with each node in the layer of interest at block 1006. The relationship between the error signal at a given node (i) in a current layer (l) to a node (j) in a previous layer (l−1), where $w_{i,j}$ represents the weighting value between the nodes i and j in an embodiment may be given by the equation:

$$\delta_i^l = \Sigma_{j=1}^N w_{ij}^l \delta_j^{l-1} \qquad (6)$$

For example, in an embodiment described with reference to FIG. 5, the error signal $\delta_7$ 514 associated with the first output node 428 of the output layer 408 may be determined using the equation:

$$\delta_7 = w_{3,1}\delta_4 + w_{3,4}\delta_5 + w_{3,7}\delta_6 \qquad (7)$$

As another example, the error signal $\delta_8$ 516 associated with the second output node 430 of the output layer 408 in such an embodiment may be found using the equation:

$$\delta_8 = w_{3,2}\delta_4 + w_{3,5}\delta_5 + w_{3,8}\delta_6 \qquad (8)$$

As yet another example, the error signal $\delta_9$ 518 associated with the third output node 432 of the output layer 408 in such an embodiment may be determined using the equation:

$$\delta_9 = w_{3,3}\delta_4 + w_{3,6}\delta_5 + w_{3,9}\delta_6 \qquad (9)$$

Because the weighting values (e.g. 470-486) between the second layer 406 and the output layer 408 in the neural network 400 in such an embodiment may be known, and the error signals $\delta_7$ 514, $\delta_8$ 516, and $\delta_9$ 518 associated with the first output node 428, second output node 430, and third output node 432, respectively, may be also known, the three equations 7-9 may then be used to determine the error signals $\delta_4$ 508, $\delta_5$ 510, $\delta_6$ 512 associated with the first node 422, second node 424, and third node 426 of the second layer 406.

At block 1008, the learning dynamic gamma-correction optimization system in an embodiment may store the error signal associated with each node in the layer of interest in an error signal vector. The learning dynamic gamma-correction optimization system in such an embodiment may further associate each stored error signal with the node in the layer of interest that generated that error. For example, the learning dynamic gamma-correction optimization system in an embodiment described with reference to FIG. 5 may store the error signals $\delta_4$ 508, $\delta_5$ 510, $\delta_6$ 512 determined at block 1006 within an error signal vector associated with the second layer 406. Further, error signal $\delta_4$ 508 may be associated within the error signal vector with the first node 422 of the second layer 406, $\delta_5$ 510 may be associated within the error signal vector with the second node 424 of the second layer 406, and $\delta_6$ 512 may be associated within the error signal vector with the third node 426 of the second layer 406.

The learning dynamic gamma-correction optimization system may determine at block 1010 whether the error signal vector has been stored for each non-input layer of the neural network in an embodiment. For example, in an embodiment described with reference to FIG. 5, the learning dynamic gamma-correction optimization system may determine whether an error signal vector has been stored for each of the first layer 404, the second layer 406, and the output layer 408. If an error signal vector has not been stored for each non-input layer in an embodiment, the method may proceed to block 1012. If an error signal vector has been stored for each non-input layer in an embodiment, each of the error signals associated with each node of each non-input layer may have been determined, and the method may end.

At block 1012, the learning dynamic gamma-correction optimization system in an embodiment may define the layer immediately before the layer of interest as a new layer of interest. For example, in an embodiment described with reference to FIG. 5 in which the second layer 406 was defined as the layer of interest at block 1004, the first layer 404 may be defined at block 1012 as the new layer of interest. The method may then proceed back to blocks 1006-1010 in order to determine error signals associated with each of the nodes of the first layer 404 using equations 10-12, and store those error signals in an error signal vector associated with the first layer 404. In such a way, the learning dynamic gamma-correction optimization system in such an embodiment may determine every error signal associated with a node in a non-input layer.

Figure 11:
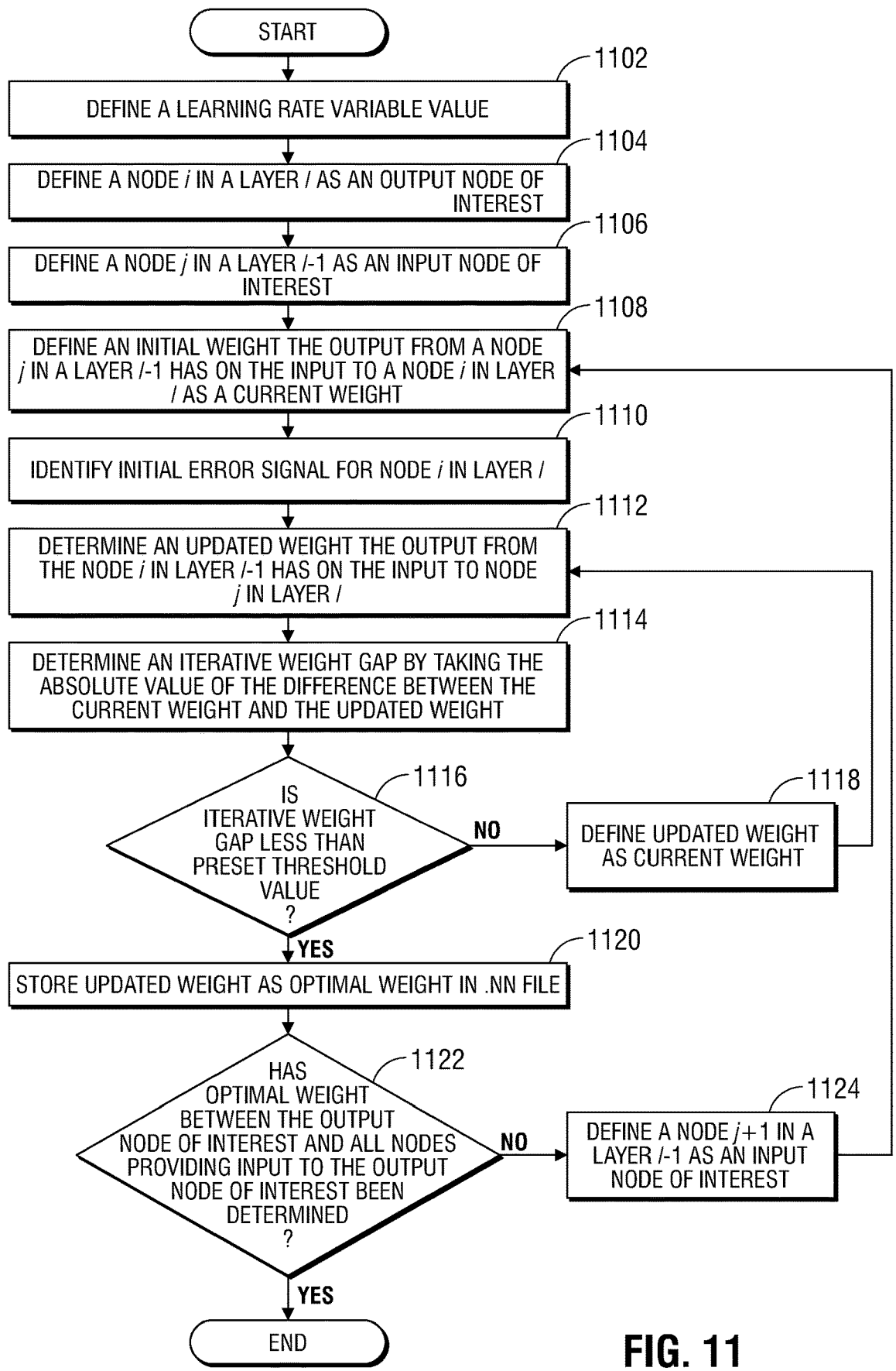
FIG. 11 is a flow diagram of a method for minimizing error signals between layers of a neural network according to an embodiment of the present disclosure.

FIG. 11 is a flow diagram of a method for minimizing error signals between layers of a neural network by minimizing the cost function associated with each layer according to an embodiment of the present disclosure. As described herein, an error signal generated at a layer of the neural network may propagate forward and impact the output of the next layer. The learning dynamic gamma-correction optimization system in an embodiment may operate to minimize these errors between each node of each layer. Error signals generated at the hidden layer immediately preceding the output layer can be said to have a "cost" or degree to which the error impacts the output layer, and this cost may be described by the cost function for the output layer, which may be approximated in an embodiment as:

$$C_{ij}^l = \tfrac{1}{2}(Y_i - a_{l-1,j})^2 \qquad (13)$$

where $C_{ij}^1$ is the cost of the errors associated with the activation $a_{l,j}$ at the node j of layer l−1 on the output $Y_i$ at the node i of the output layer. Similarly, cost function for each of the hidden layers may be approximated in an embodiment as:

$$C_{ij}^l = \tfrac{1}{2}(a_{l,i} - a_{l-1,j})^2 \qquad (14)$$

Where $C_{ij}^l$ is the cost of the errors associated with the activation $a_{l-1,j}$ at the node j of layer l−1 on the activation $a_{l,j}$ at the node i of the hidden layer l. This reflects a cost estimation analysis of the errors as between adjacent layers.

For example, in an embodiment described with reference to FIG. 5, the cost of errors associated with the activation $a_{2,1}$ of the first node 422 of the second layer 406 on the first output node 428 of the output layer 408 may be represented by the equation:

$$C_{1,1}^3 = \tfrac{1}{2}(Y_1 - a_{2,1})^2 \qquad (15)$$

where $C_{1,1}^3$ is the cost of the errors associated with the activation $a_{2,1}$ at the first node 422 of second layer 406 on the output $Y_1$ at the first output node 428 of the output layer 408. As another example, the cost of errors associated with the activation $\alpha_{1,3}$ of the third node 420 of the first layer 404 on the second output node 424 of the second layer 406 may be represented by the equation:

$$C_{2,3}^2 = \tfrac{1}{2}(a_{2,2} - a_{1,3})^2 \qquad (16)$$

Where $C_{1,1}^3$ is the cost of the errors associated with the activation $a_{2,1}$ at the first node 422 of second layer 406 on the output $Y_1$ at the first output node 428 of the output layer 408. Upon performing a forward propagation method through the neural network in an embodiment, each activation and output value may be known. Thus, the cost functions between each node in each layer of the neural network may also be known.

The learning dynamic gamma-correction optimization system in an embodiment may minimize the cost function between each node of each layer of the neural network in an embodiment using a gradient-descent method. In an embodiment, a gradient descent method may be a first order iterative optimization method for finding the minimum of a function (e.g. the cost function). A gradient descent method for minimizing a cost function between two nodes in a neural network, where one of the nodes is an output node of the output layer in an embodiment may be given by the equation:

$$w_{l-1,j}[n+1] = w_{l-1,j}[n] - \eta \delta_i \frac{df(w_{l-1,j})}{dw_{l-1,j}} Y_i \quad (17)$$

where $w_{l-1,j}[n]$ represents an initial weighting value between a node j in layer l−1 and a node i in the output layer, and $w_{l-1,j}[n+1]$ represents an updated weighting value between a node j in layer l−1 and a node i in the output layer. The variable n represents an iteration value, η represents a learning rate variable, $\delta_i$ represents the error generated at node i in the output layer l, f represents the sigmoid function, and $Y_i$ represents an output for a node i in layer l. Similarly, a gradient descent method for minimizing a cost function between two hidden layer nodes in a neural network in an embodiment may be given by the equation:

$$w_{l-1,j}[n+1] = w_{l-1,j}[n] - \eta \delta(a_{l,i}) \frac{df(w_{l-1,j})}{dw_{l-1,j}} a_{l,i} \quad (18)$$

where $\delta(a_{l,i})$ represents the error generated at node i in the layer l.

At block 1102 in an embodiment, a learning rate variable value may be a defined value. The learning rate η in an embodiment may define the size of the steps each iteration takes toward reaching the minimum cost function. If the learning rate is too large, the minimum cost function may be passed over between two iterations, thus resulting in divergence, or an inability to identify the minimum cost function. If the learning rate is too small, a greater number of iterations, and thus, a longer amount of time may be needed to identify the minimum cost function. The value of η may be preset by the learning dynamic gamma-correction optimization system so as to cause the gradient descent equation (17 or 18) to converge, rather than diverge. For example, the learning dynamic gamma-correction optimization system may preset the learning rate η to a value of one. The learning dynamic gamma-correction optimization system in other embodiments may present the learning rate to other values, such as 0.1, or 10.

At block 1104 in an embodiment, the learning dynamic gamma-correction optimization system may define a node i in a layer 1 as an output node of interest. For example, in an example embodiment described with reference to FIG. 5, the learning dynamic gamma-correction optimization system may define the second output node 430 of the output layer 408 as an output node of interest. In other words, in such an embodiment i=2, and l=3.

The learning dynamic gamma-correction optimization system in an embodiment may define a node j in a layer l−1 as an input node of interest at block 1106. For example, in an example embodiment described with reference to FIG. 5, the learning dynamic gamma-correction optimization system may define the second node 424 of the second layer 406 as an input node of interest. In other words, in such an embodiment j=2, and l−1=2. By identifying this node as the input node of interest, the learning dynamic gamma-correction optimization system may begin the process of identifying an optimal weight $w_{3,5}'$ to assign the relationship between the input node of interest 424 (e.g. node j in layer l−1) and the output node of interest 430 (e.g. node i in layer l) using the gradient descent method to minimize the cost function between these two nodes.

At block 1108, in an embodiment, the learning dynamic gamma-correction optimization system may define an initial weight the output from a node j in a layer l−1 has on the input to a node i in a layer l as a current weight. For example, the learning dynamic gamma-correction optimization system in an embodiment may define an initial weight $w_{3,5}$ at a first iteration (n=1) at block 1102 of one.

The learning dynamic gamma-correction optimization system in an embodiment may determine an initial error signal for the node i in a layer l at block 1110. For example, in an embodiment described with reference to FIG. 5, the learning dynamic gamma-correction optimization system may determine an initial error signal $\delta_8$, representing the error signal associated with the second node 530 in the output layer 508. The learning dynamic gamma-correction optimization system in such an embodiment may determine the value of this initial error signal $\delta_8$ by referencing the error signal matrix generated for the output layer 508 during back propagation, as described with reference to FIG. 10.

In an embodiment, at block 1112, the learning dynamic gamma-correction optimization system may determine an updated weight the output from node j in layer l−1 has on the output from node i in layer l. The learning dynamic gamma-correction optimization system in an embodiment may determine an updated weight using equation (17) above in order to identify the way in which changing the weight affects the cost function for the first iteration (e.g. where n=1). For example, in an embodiment described with reference to FIG. 5, the learning dynamic gamma-correction optimization system in an embodiment may determine an updated weight between the second node 424 of the second layer 406 and the second output node 430 in the output layer 408 using the equation:

$$w_{3,5}[n+1] = w_{3,5}[n] - \eta \delta_8 \frac{df(w_{3,5})}{dw_{3,5}} Y_2 \quad (19)$$

The value $Y_2$ in such an embodiment may have been previously determined during forward propagation through the neural network, as described with reference to FIG. 9. The updated weight $w_{3,5}[2]$ in an embodiment may be associated with a lower cost function in an embodiment than the initial weight $w_{3,5}[1]$.

At block 1114, the learning dynamic gamma-correction optimization system in an embodiment may determine an iterative weight gap for the current iteration by taking the absolute value of the difference between the current weight and the updated weight. The learning dynamic gamma-correction optimization system in an embodiment may determine an iterative weight gap using the equation:

$$\text{Weight Gap}_{ij}^l = \|w_{l-1,j}[n+1] - w_{l-1,j}[n]\| \quad (20)$$

For example, in an embodiment described with reference to FIG. 5, the weight gap associated with the weight between the third node 426 in the second layer 406 and the second node 430 in the output layer 408 may be determined using the equation:

$$\text{Weight Gap}_{3,5} = \|w_{3,5}[2] - w_{3,5}[1]\| \quad (21)$$

The learning dynamic gamma-correction optimization system in an embodiment may determine whether the iterative weight gap is less than a preset threshold value at block 1116. Each iteration of equation (17) or (18) in an embodiment may provide an updated weight converging on the current weight (e.g. weight determined in the last iteration). Convergence of the updated weight on the current weight in an embodiment may indicate a minimum of the cost function has been identified. The difference between the updated weight and the current weight, as represented by the weight gap can be said to have converged in an embodiment when it reaches a preset threshold value. For example, the learning dynamic gamma-correction optimization system in an embodiment may preset a value of 0.001 for a threshold value the weight gap must meet. If the weight gap has not met this threshold value, the learning dynamic gamma-correction optimization system in an embodiment may move onto the next iteration of the gradient descent method in order to reach a convergence point. Thus, if the iterative weight gap is not less than the preset threshold value, the method may proceed to block 1118 for another iteration of the gradient descent method. If the iterative weight gap is less than the preset threshold value, the method may proceed to block 1120.

At block 1118 in an embodiment, the learning dynamic gamma-correction optimization system may define the updated weight as the current weight. Doing so may initiate a new iteration of the gradient descent method. For example, the learning dynamic gamma-correction optimization system in an embodiment may define the value $w_{3,8}[2]$ that was determined at block 1112 for the first iteration as the current weight. The method may then proceed back to block 1112 where an updated weight may be determined based on this newly defined current weight. In other words, the learning dynamic gamma-correction optimization system may perform a second iteration (e.g. where n=2) using the gradient descent equation:

$$w_{3,5}[3] = w_{3,5}[2] - \eta \delta_8 \frac{df(w_{3,5})}{dw_{3,5}} Y_2 \quad (22)$$

The learning dynamic gamma-correction optimization system in an embodiment may repeat this loop between block 1112 and block 1118 until the weight gap converges, indicating the updated weight determined at block 1112 in the most recent loop is associated with a minimum value for the cost function.

At block 1120, the learning dynamic gamma-correction optimization system in an embodiment may identify the updated weight determined at block 1112 as the optimal weight between the input node of interest and the output node of interest if the iterative weight gap is less than the preset threshold value. For example, in an embodiment described with reference to FIG. 5, the learning dynamic gamma-correction optimization system may identify a converging weight gap after 100 iterations, such that the magnitude of the difference between the updated weight $w_{3,5}[101]$ and the current weight $w_{3,5}[100]$ meets the threshold value in block 1116. Because the weight gap meets the threshold value, the updated weight generates a minimum cost function between the input node of interest and the output node of interest. This updated weight may be stored as the optimal weight associated with the relationship between the second node 424 of the second layer 406 and the second node 430 of the output layer 408 in a neural network (.nn) data file in an embodiment.

The output value for the output node of interest in an embodiment may be dependent upon several different inputs from nodes in the previous layer (e.g. input nodes of the output node of interest). Thus, in order to minimize the errors associated with the output node of interest, the learning dynamic gamma-correction optimization system in an embodiment may minimize the cost function associated with the output node of interest and each of the nodes in the previous layer affecting the value of the output node of interest. In order to do so, it may be determined at block 1122 in an embodiment whether the optimal weight between the output node of interest and all nodes providing input to the output node of interest has been determined. For example, in an embodiment described with reference to FIG. 5 in which the output node of interest is the second output node 430 of the output layer 408 and the current input node is the second node 424 of the second layer 406, it may be determined that the optimal weight between the second output node 430 of the output layer 408 and the third node 426 of the second layer 406 has not yet been determined. If the optimal weight between the output node of interest and all nodes providing input to the output node of interest has not been determined, the method may proceed to block 1124. If the optimal weight between the output node of interest and all nodes providing input to the output node of interest has been determined, all weights associated with the designated output node may have been identified and stored in a .nn file, and the method may end.

At block 1124, the learning dynamic gamma-correction optimization system in an embodiment may define a node j+1 in layer l−1 as an input node of interest if the optimal weights between the output node of interest and each of the nodes providing input to the output node of interest have not been determined. For example, in an embodiment described with reference to FIG. 5 in which the optimal weights between the second output node 430 of the output layer 408 have not been determined and the current input node of interest is the second node 424 of the second layer 406 (e.g. j=2), the learning dynamic gamma-correction optimization system may define the third node 426 of the second layer 236 (e.g. j=3) as the current input node of interest. The method may then proceed back to block 1108. By repeating the loop 1108 to 1120 for the third node 426 of the second layer 236, the learning dynamic gamma-correction optimization system in such an embodiment may the determine the optimal weight between the second output node 430 of the output layer 408 and the third node 426 of the second layer 406, which may be the last of the nodes providing input to the second output node 430 of the output layer 408.

The method illustrated by FIG. 11 may be repeated for each node in a non-input layer until all of the weights between all of the nodes in all of the layers have been determined. For example in an embodiment described with reference to FIG. 5, the method illustrated by FIG. 11 may be repeated, where each repetition defines a different output node of interest, including each of nodes 416-432. In such a way, each of the weights 434-486 may be optimized using the gradient-descent method described herein. The method of FIG. 11 may then end.

The blocks of the flow diagrams of FIGS. 7-11 or steps and aspects of the operation of the embodiments herein and discussed above need not be performed in any given or specified order. It is contemplated that additional blocks, steps, or functions may be added, some blocks, steps or functions may not be performed, blocks, steps, or functions may occur contemporaneously, and blocks, steps or functions from one flow diagram may be performed within another flow diagram.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system operating a dynamic gamma-correction optimization training system comprising:
    a processor, executing code instructions of the dynamic gamma-correction optimization training system, to identify a combination of red, green, and blue subpixel component values for a selected pixel and a plurality of surrounding adjacent pixels around the central, selected pixel that determine a limited pixel window having a preset width and a preset length as a portion a high dynamic ratio (HDR) image;
    the processor to perform a neural network training session for a neural network applying the red, green, and blue subpixel component values for the arrangement of the central, selected pixel and surrounding pixels in the limited pixel window as inputs into the neural network and train the neural network to convert input signal node values to preliminary output signal node values using an initial weighting value for each of a plurality of weighting values representing preliminary relatedness of nodes through the neural network;
    the processor to determine optimal red, green, and blue subpixel component values for the central, selected pixel and the plurality of surrounding adjacent pixels by running a gamma correction algorithm using a gamma correction factor associated with a maximum gradient energy to maintain variation between intensity of light emitted by the selected pixel and the plurality of surrounding adjacent pixels of the limited pixel window in the HDR image;
    the processor to further apply the neural network assessment to:
        compare the optimal red, green, and blue subpixel component values with the preliminary output signal node values to determine an error associated with each of the preliminary output node values; and
        determine a plurality of corrected weighting variables based on an array of intensity values for the central, selected pixel and plurality of surrounding adjacent pixels arranged around the central, selected pixel for the limited pixel window such that the neural network is trained to forward propagate input signal node values through the plurality of layers of the neural network using the plurality of corrected weighting variables to output of the optimal adjusted red, green, and blue subpixel component values to provide gamma correction for such input signal node values relating to other pixel windows similar to the limited pixel window, wherein the plurality of corrected weighting variables are determined using a gradient-descent method.

2. The information handling system of claim 1 further comprising:
    the processor executing code instructions to perform the training session on each possible combination of red, green, and blue subpixel component values for the central, selected pixel and the plurality of surrounding adjacent pixels around the central, selected pixel within the limited pixel window.

3. The information handling system of claim 1, wherein the preset width is three or more pixels and the preset length is three or more pixels.

4. The information handling system of claim 1, wherein the initial weighting value is one.

5. The information handling system of claim 1 further comprising:
    the processor storing the plurality of corrected weighting variables in a neural network file associated with the identified combination of red, green, and blue subpixel component values for input signal node values for the limited pixel window.

6. The information handling system of claim 5 further comprising:
    transmitting the neural network file to a remote information handling system for remote execution of the trained pixel window gamma correction neural network.

7. The information handling system of claim 6, wherein the neural network file may be used to form a trained neural network to yield optimal red, green, and blue subpixel component values for gamma correction for pixel windows across a plurality of portions of the high dynamic ratio (HDR) image.

8. A method for operating a dynamic gamma-correction optimization training system comprising:
    identifying, for a display device, a combination of red, green, and blue subpixel component values for a central, selected pixel and a plurality of surrounding adjacent pixels around the central, selected pixel within a limited pixel window having a preset width and preset length as a portion of a high dynamic ratio (HDR) image;
    performing, via a processor executing code instructions of a dynamic gamma-correction optimization training system, a neural network training session by applying the red, green, and blue subpixel component values for the arrangement of the central, selected pixel and surrounding pixels in the limited pixel window as inputs into the neural network and to train the neural network to convert input signal node values to preliminary output signal node values using an initial weighting value for each of a plurality of weighting values representing preliminary relatedness of nodes through the neural network;

determining optimal red, green, and blue subpixel component values for the central, selected pixel and the plurality of surrounding pixels by running a gamma correction algorithm using a gamma correction factor associated with a maximum gradient energy to maintain variation between intensity of light emitted by the central, selected pixel and the plurality of surrounding adjacent pixels arranged in the limited pixel window of the HDR image;

comparing the optimal red, green, and blue subpixel component values with the preliminary output signal node values to determine an error associated with each of the preliminary output node values; and determining a plurality of corrected weighting variables based on an array of intensity values for the central, selected pixel and plurality of surrounding adjacent pixels around the selected pixel for the limited pixel window for use with a trained neural network, such that forward propagating the input signal node values of a selected pixel and pixel window through the plurality of layers of the neural network using the plurality of corrected weighting variables results in output of the optimal adjusted red, green, and blue subpixel component values to provide gamma correction for the input signal node values relating to other pixel windows similar to the limited pixel window, wherein the plurality of corrected weighting variables are determined using a gradient-descent method.

9. The method of claim 8 further comprising:
performing the training session on each possible combination of red, green, and blue subpixel component values for the central, selected pixel and the plurality of surrounding adjacent pixels around the selected pixel within the limited pixel window.

10. The method of claim 8, wherein the preset width is three or more pixels and the preset length is three or more pixels.

11. The method of claim 8, wherein the initial weighting value is one.

12. The method of claim 8, wherein the preset width is five pixels and the preset length is five pixels.

13. The method of claim 8, wherein the neural network includes a number of hidden layers equivalent to a number of pixels included in the preset width of the pixel window.

14. The method of claim 8, wherein the neural network includes three hidden layers.

15. A method for operating a dynamic gamma-correction optimization training system comprising:
identifying, for a display device, a combination of red, green, and blue subpixel component values for a central, selected pixel and a plurality of surrounding adjacent pixels around the selected pixel within a limited pixel window having a preset width and preset length as a portion of a high dynamic ratio (HDR) image;

performing, via a processor executing code instructions of a dynamic gamma-correction optimization training system, a neural network training session by applying the red, green, and blue subpixel component values for the arrangement of the central, selected pixel and surrounding pixels in the limited pixel window as inputs into the neural network and to train the neural network to convert input signal node values to preliminary output signal node values using an initial weighting value for each of a plurality of weighting values representing preliminary relatedness of nodes through the neural network, wherein the initial weighting value is one;

determining optimal red, green, and blue subpixel component values for the central, selected pixel and the plurality of surrounding pixels by running a gamma correction algorithm using a gamma correction factor associated with a maximum gradient energy to maintain variation between intensity of light emitted by the central, selected pixel and the plurality of surrounding adjacent pixels arranged in the limited pixel window of the HDR image;

comparing the optimal red, green, and blue subpixel component values with the preliminary output signal node values to determine an error associated with each of the preliminary output node values;

determining a plurality of corrected weighting variables based on an array of intensity values for the central, selected pixel and plurality of surrounding adjacent pixels around the central, selected pixel for the limited pixel window for use with a trained neural network, such that forward propagating the input signal node values of a selected pixel and pixel window through the plurality of layers of the neural network using the plurality of corrected weighting variables results in output of the optimal adjusted red, green, and blue subpixel component values to provide gamma correction for the input signal node values relating to other pixel windows similar to the limited pixel window; and determining output of the optimal adjusted red, green, and blue subpixel component values to provide gamma correction via the trained neural network for the input signal node values of a second limited pixel window adjacent to the first limited pixel window arranged with a second central, selected pixel and second plurality of surrounding adjacent pixels around the second central, selected pixel.

16. The method of claim 15, wherein the plurality of corrected weighting variables are determined using a gradient-descent method.

17. The method of claim 15, further comprising:
storing the plurality of corrected weighting variables in a neural network file associated with the identified combination of red, green, and blue subpixel component values for input signal node values for the limited pixel window; and transmitting the neural network file to a remote information handling system for remote execution of the trained pixel window gamma correction neural network.

18. The method of claim 15, wherein the preset width is three or more pixels and the preset length is three or more pixels.

19. The method of claim 15, wherein the neural network includes a number of hidden layers equivalent to a number of pixels included in the preset width of the limited pixel window.

20. The method of claim 15, wherein the neural network includes three hidden layers.

* * * * *